United States Patent [19]
Ochiai et al.

[11] Patent Number: 5,758,939
[45] Date of Patent: Jun. 2, 1998

[54] INFORMATION SEARCHING APPARATUS

[75] Inventors: Taketo Ochiai; Naoki Manabe; Masashi Yahara, all of Yokohama, Japan

[73] Assignee: Canon Kabushiki Kaisha, Tokyo, Japan

[21] Appl. No.: 705,498

[22] Filed: Aug. 29, 1996

[30] Foreign Application Priority Data

Aug. 31, 1995 [JP] Japan ................................. 7-248715
Sep. 25, 1995 [JP] Japan ................................. 7-271960
Sep. 25, 1995 [JP] Japan ................................. 7-271962

[51] Int. Cl.$^6$ ................................................. G03B 21/14
[52] U.S. Cl. ........................ 353/25; 353/27 A; 353/26 A
[58] Field of Search ........................... 353/25, 26 R, 353/26 A, 27 R, 27 A, 22, 23

[56] References Cited

U.S. PATENT DOCUMENTS

| | | | |
|---|---|---|---|
| 4,465,349 | 8/1984 | Rinn et al. | 353/25 |
| 4,529,281 | 7/1985 | DeRoche et al. | 353/27 A |
| 4,752,124 | 6/1988 | Ueda et al. | 353/26 R |
| 4,830,484 | 5/1989 | Yamamoto et al. | 353/25 |
| 4,875,768 | 10/1989 | Hiragawa | 353/27 A |
| 4,910,538 | 3/1990 | Ochiai et al. | 346/162 |
| 4,972,068 | 11/1990 | Ohtani et al. | 235/375 |
| 5,001,501 | 3/1991 | Imai et al. | 346/160.1 |
| 5,077,566 | 12/1991 | Ochiai et al. | 346/153.1 |
| 5,642,925 | 7/1997 | Yamamoto et al. | 353/25 |

*Primary Examiner*—William Dowling
*Attorney, Agent, or Firm*—Fitzpatrick, Cella, Harper & Scinto

[57] ABSTRACT

A search apparatus includes a device for transporting a long recording medium and positioning a desired image on the recording medium in a predetermined position, and a device for moving a carrier, supporting the recording medium, in the width direction thereof. The apparatus is provided with a detection device for detecting the reference position of the carrier, and when the carrier is moved, the moving distance of the carrier is measured without failure after the reference position has been detected. Movement of the carrier is controlled on the basis of the measurement value.

20 Claims, 22 Drawing Sheets

INFORMATION SEARCHING APPARATUS

BACKGROUND OF THE INVENTION

1. Field of the Invention

The present invention relates to an information searching apparatus including means for transporting a long information recording medium and causing a desired image information portion where the information is recorded onto the recording medium to be positioned in a predetermined position for information search and movement means for moving the recording medium in the transversal direction thereof, such as a roll microfilm carrier provided in a microfilm reader or a microfilm reader-printer.

2. Related Background Art

The roll microfilm carrier, serving as an information searching device provided in a microfilm reader, a microfilm reader-printer or the like (hereinafter represented as an apparatus main body such as a reader) is provided with film transport means for transporting a rolled microfilm serving as a long information recording medium, in the forward and backward directions between a winding portion and a rewinding portion through a projecting position (film illuminating portion), wherein the film transport means is automatically driven and stopped such that a desired image frame portion is searched at the projecting position, and stopped and positioned there by comparison calculation of address information inputted in advance into a control unit by input means, of a desired image frame portion to be searched, and mark detection information inputted into the control unit from mark detection means for detecting search marks attached in advance to the respective image frame portions recorded along the longitudinal direction of the film in the course of forward or backward transportation of the film (automatic search operation mode). There is also provided a dial for manually controlling the film transport means, and it is also possible by operation of the dial to transport the film in the forward or backward direction to cause a desired image frame portion to be positioned in the projecting position (manual search operation mode).

The searched image frame portion placed in the projecting position, can be projected and focused in enlarged manner on to a reader screen by a projection optical system of the apparatus main body such as a reader, thus it is capable of being read. In case of a reader-printer, if an enlarged print of the image frame portion is desired, a print button is depressed to activate a printing mechanism, whereby the image frame portion is projected and focused on a recording medium in enlarged manner to carry out printing.

The rolled microfilm has certain standards (modes) in format of microimage recording, as exemplified in FIGS. 11A, 11B and 11C.

FIG. 11A shows a microfilm having one microimage recorded in a width direction of the film F (microfilm having one channel recorded in the width direction). The film of such format can be called "simplex film".

FIG. 11B shows a microfilm having two different microimages recorded in the width direction of the film F (microfilm having two channels recorded in the width direction). The film of such format can be called "duo film".

FIG. 11C shows a microfilm having front image and back image of the same image recorded in the width direction of the film F (microfilm having two channels recorded in the width direction). The film of such format can be called as "duplex film".

Each of the microfilms F shown in FIGS. 11A to 11C includes an image frame portion recorded in succession along the longitudinal direction of the film F, and a search mark m attached corresponding to each image frame portion. In the automatic search mode, the search mark m is detected by mark detection means in the course of the forward or backward transportation of the film, and the film transport means is so automatically driven and stopped that the desired image frame is searched and stopped at the projecting position.

Setting and adjusting the stopped position of the image frame portion with respect to the longitudinal direction of the film (film transporting direction) relative to the projecting position is possible by the control of the film transport means. More specifically, concerning the film transporting direction, the stopped position of the image frame portion relative to the projecting position can be so set that the image frame portion is projected onto the reader screen of the apparatus main body such as a reader and is accommodated within a predetermined print frame.

In case of a microfilm having two channels recorded in the width direction such as the duo film in FIG. 11B or the duplex film in FIG. 11C, the switching of the channels relative to the projecting position can be made by moving a film carrier (or an upper carrier unit including the film transport means) in the width direction, which is rendered movable in the width direction of the film relative to a supporting unit.

The device for moving the film carrier in the width direction of the film is conventionally composed of a manual operation member such as a knob or a lever, and a link mechanism for mechanically linking such manual operation member with the film carrier, and the switching of the channels on the duo or duplex film is achieved by operating the manual operation member by the operator, while observing the microfilm image projected on the reader screen, and moving the film carrier in the width direction of the film with respect to the apparatus main body such as a reader, thereby altering the relative position between the film and the screen.

In such construction, however, in case of projecting a microimage belonging to a channel different from that of the currently projected microimage, it is necessary to move the film carrier by operating the manual operation member troublesomely. Further such operating has to be made cautiously in order to completely project a desired microimage on the screen in consideration of the relative position of the film and the screen. As a result, the microimage projecting operation cannot be executed effectively as a whole.

Also, even when a search is made under the control by an external equipment, the channel is changed, so that the automatic search operation is temporarily interrupted at that time, and because the projected position has to be adjusted by the manual operation, the operator is required to operate both the external equipment and the film carrier as an information search apparatus, or there are required plural operators for such operations.

For this reason there is already known an apparatus which switches the channels of the duo film, by automatic movement of the film carrier in the width direction of the film when the channel is identified after the search (U.S. Pat. No. 4,752,124).

However, even in such automatic apparatus, when the film cartridge is changed for example for projecting a simplex film having only one microimage recorded in the width direction of the film, the projected position may be different from that of the preceding film, for example a duo film, so that the operator is required to alter the relative position of the film and the screen by manually moving the film carrier, while observing the image of the microfilm projected on the screen.

Also, the setting of the image position has to be done over again at the start of the search because the image position in each channel of the duo film or that of the simplex film is different in each film and each projecting magnification, and also because the image position of each channel in the duo film is moved relatively.

Furthermore, in each of the microfilms F mentioned above, the duo film shown in FIG. 11B has search marks m on both sides of the microfilm F, while the duplex film in FIG. 11C or the simplex film in FIG. 11A has the search marks m on one side of the microfilm F.

In the automatic search mode, such search marks m are detected by the mark detection means in the course of forward or backward transportation of the film, and the film transport means is so automatically driven and stopped that the desired image frame portion is searched and stopped at the projecting position. In the duo film, however, when an image at the opposite side in the width direction of the film is projected onto the screen, there will arise a problem that an input key for carrier movement (a fine adjustment key for the carrier position) is operated and the operation has to continue during the movement of the film carrier.

Also, in the case of duplex or simplex film, there is required a similar operation if it is desired to project an image at the opposite side with the movement of the film carrier or to project a part of the image on the screen, depending on the projecting magnification, thus there also arise a problem that the use of such fine adjustment key requires much time for image positioning because of the low movement speed of the film carrier and slow operation.

SUMMARY OF THE INVENTION

In consideration of the foregoing, the object of the present invention is, in an information searching apparatus provided with means for transporting a long information recording medium thereby searching and bringing a desired image frame portion recorded on the recording medium to a predetermined position, and moving means for moving the apparatus in the width direction of the recording medium, (1) to achieve positioning in the width direction of the information recording medium, of a desired image information portion relative to a predetermined position with no trouble, (2) to achieve efficiently projecting operation of a desired image information portion independent of the standard for recording of the image information of the information recording medium, and (3) to enable secure projection of a desired image information portion on the screen.

Another object of the present invention is, in an information searching apparatus adapted to move a long information recording medium in the longitudinal direction thereof relative to search means and to search recorded information by detecting, with detection means, search marks attached corresponding to the information recorded on the information recording medium, and provided with means for moving the apparatus in the width direction of the information recording medium, to increase the speed of movement of the apparatus in the width direction of the information recording medium, thereby improving the work efficiency.

For a microfilm carrier, the information searching apparatus of the present invention is provided with a device for moving the carrier in the width direction of the microfilm serving as an information recording medium, and is adapted, in case of replacing the film and projecting a film other than the duo film, to automatically move a position other than that in the duo film when the film is identified as a non-duo film since the projecting position may be different from the preceding position.

The movement by such carrier moving device can be achieved by a simple construction including means for moving the film in the width direction thereof and a reference sensor provided at a predetermined position in the width direction of the film, employing an absolute movement method of moving the film by a predetermined movement amount with the basis of such reference sensor. The image position projected on the microfilm in the width direction thereof varies depending on the recording apparatus, recording format and recording image reduction rate, therefore, an amount of movement from the reference sensor is inputted as the movement amount and memorized.

For a microfilm carrier, the information searching apparatus of the present invention is provided, in the film carrier, with a width direction drive device as a device for moving an information recording medium in the width direction, which is so controlled, by the operation of a predetermined input device, as to promptly move the projecting position (the carrier position or the image position on the screen) to project desired image information of the information recording medium onto a predetermined position. Consequently, the movement for example, from the image position on one side of the film to that on the other side can be made only with an operation on the input device, and it is no longer necessary to keep depressing a fine adjustment key for the carrier position until the carrier is moved to the desired position with the moving speed of fine adjustment such as the prior art. For such movement since the distance to the desired position is known in advance, thus an optimum speed control is possible and it can reach the desired position within a shortest time.

Also, when the stopped position of the carrier is deviated from the predetermined position, it can be promptly returned to such predetermined position by a similar operation without using the fine adjustment key for the carrier position.

According to the present invention, the carrier is provided with a width direction drive means as means for moving the information recording medium in the width direction thereof, and means for calculating backlash amount, thereby automatically calculating the amount of backlash and correcting the amount of movement. Thereby, each apparatus may have an amount of backlash and the movement of the film carrier in the width direction of the film can be made without paying particular attention to the backlash.

Also, upon inputting the amount of movement of the film in the width direction thereof from the input means, the film carrier is moved by such inputted amount of movement at the time the amount of movement is inputted, with correcting the backlash amount, whereby the amount of movement can be exactly inputted without paying attention to the backlash amount, and the movement is achieved, exactly following the inputted amount of movement.

Furthermore, the backlash drive is made at drive speed faster than that for moving the film carrier in the width direction of the film, whereby even in the fine adjustment of the position of the projected image, there can be reduced the time in which the projected image position does not change.

DESCRIPTION OF THE PREFERRED EMBODIMENTS

[First Embodiment]

Figure 1:
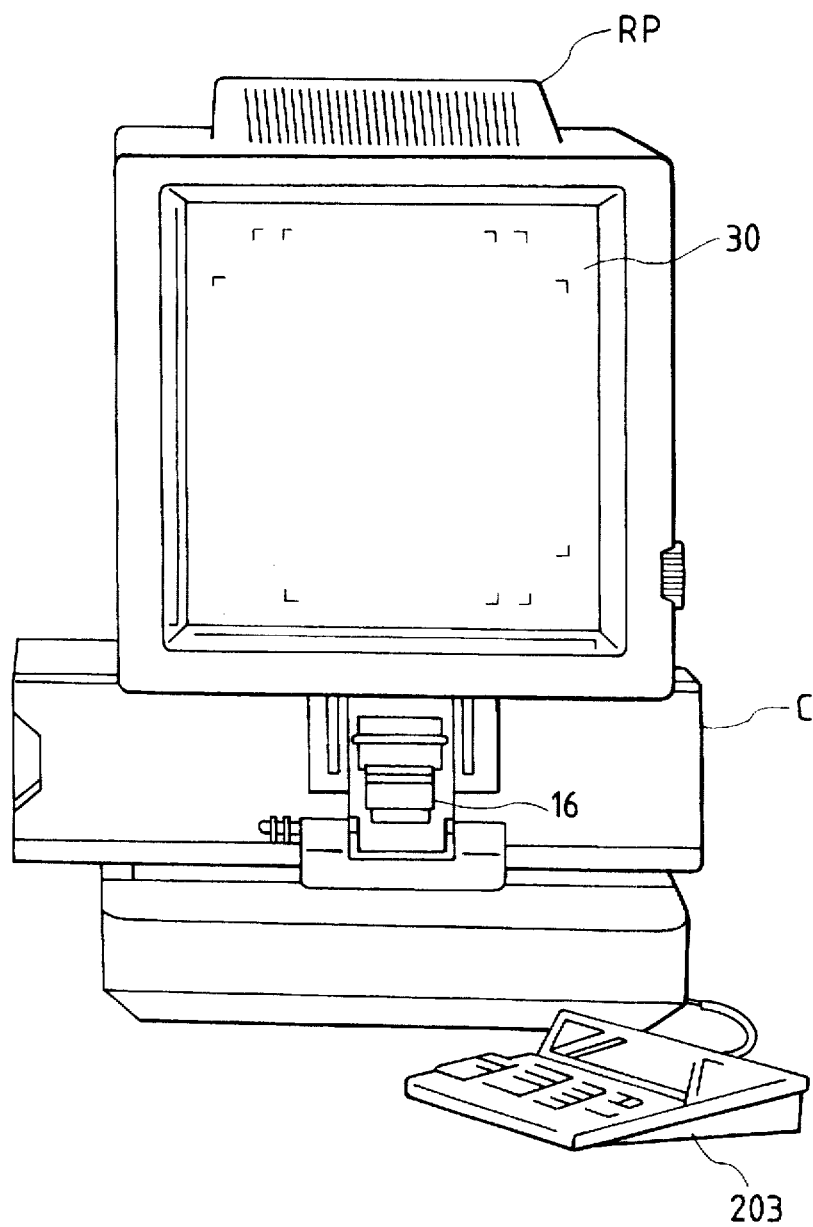
FIG. 1 is a front view of a microfilm reader-printer equipped with a film carrier constituting an information searching apparatus according to the present invention.
Figure 2:
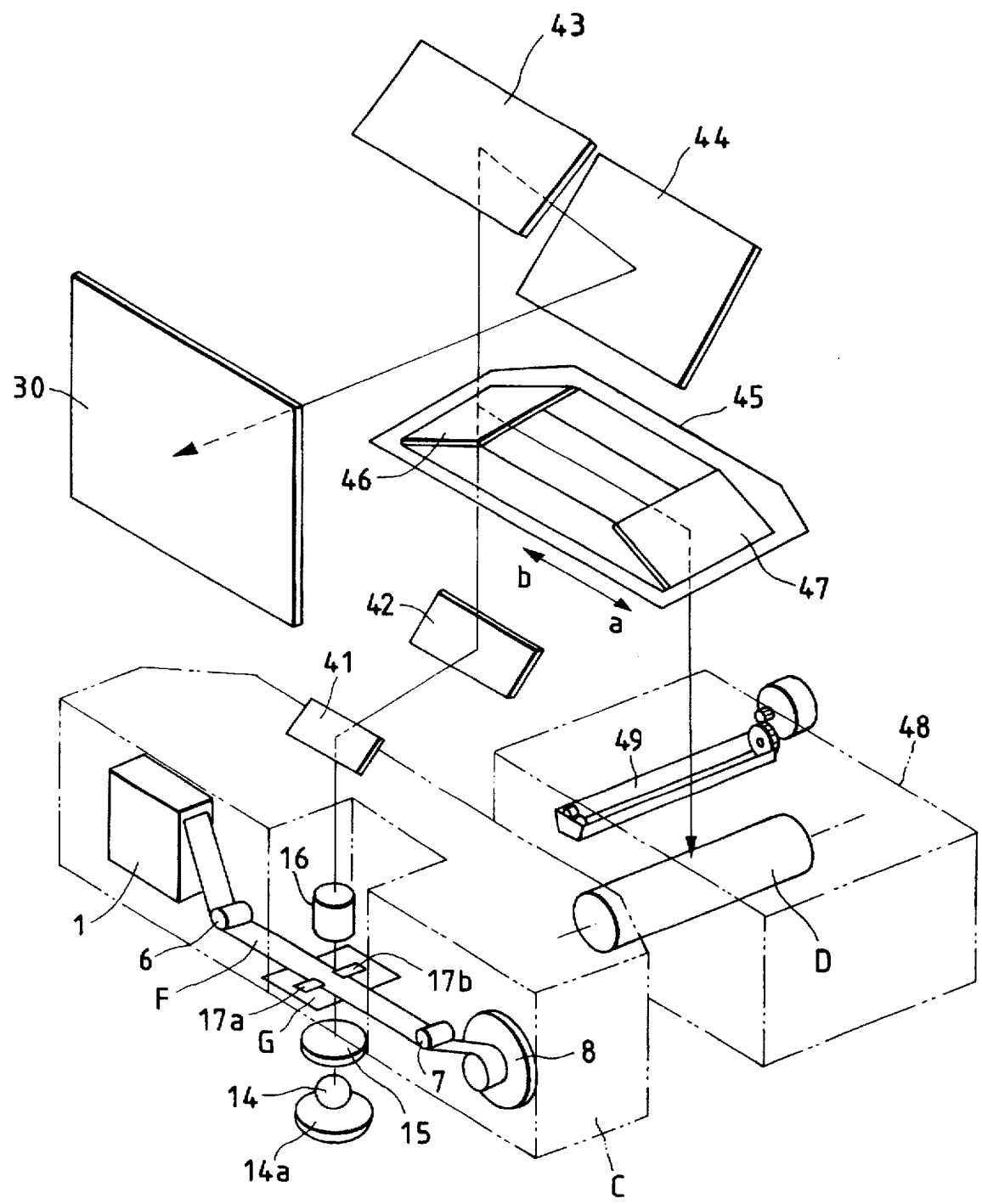
FIG. 2 is a perspective view of an optical system in the reader-printer.

(1) Reader-printer (FIGS. 1 and 2)

FIG. 1 is a front view of a microfilm reader-printer equipped with a film carrier as an information searching apparatus according to the present invention, wherein shown are a reader-printer RP; a film carrier C provided in the reader-printer; a reader screen 30; a projection lens 16; and a control device (keyboard) 203 constituting input means.

FIG. 2 is a perspective view of an optical system in the reader-printer. A desired image frame portion of a rolled microfilm F is searched and positioned, by an automatic image frame searching operation of the film carrier C to be explained later, on a projecting glass portion G constituting a projecting position. The image frame portion is illuminated from the lower side by illumination means composed of a light source lamp 14, a spherical mirror 14a, a condenser lens 15 and the like each provided in the main body side of the reader-printer in a lower side of the projecting glass portion G. The light transmitted through the film is projected and focused by a reader optical system composed of a projection lens 16 and first to fourth mirrors 41 to 44 onto the back face of the reader screen (light diffusing plate) 30 in magnified manner with a predetermined magnification, whereby a magnified image of the microimage can be observed from the front side of the reader screen 30 (reader mode).

There are also provided a scanner 45 including a first scanning mirror 46 and a second mirror 37, and a print mechanism unit 48. The scanner 45 is controlled so as to be advanced or retracted perpendicularly to an optical path between the second fixed mirror 42 and the third fixed mirror 43 of the reader optical system in directions a and b as shown in FIG. 2. Upon the reader mode, the first scanning mirror 46 is maintained in a state retracted from the above-mentioned optical path. When the operator desires to obtain a print of the microimage projected on the screen in enlarged manner, the operator depressed a print button to activate the print mechanism 48 and to move the scanner 45 in a direction toward the above-mentioned optical path, whereby the image light in the optical path is scanned by the first scanning mirror 46. The scanned light is projected and focused through the second scanning mirror 47 and an exposure controlling shutter 49 onto a recording medium D in magnified manner, thereby forming a print (print mode).

Though the details of the print mechanism 48 are not explained, it can be, for example, composed of an electrophotographic copying mechanism of image transfer type, employing a drum-shaped electrophotographic sensitive member D. In such case the scanning speed of the scanner 45 is ½ of the peripheral speed of the photosensitive member D.

Figure 3:
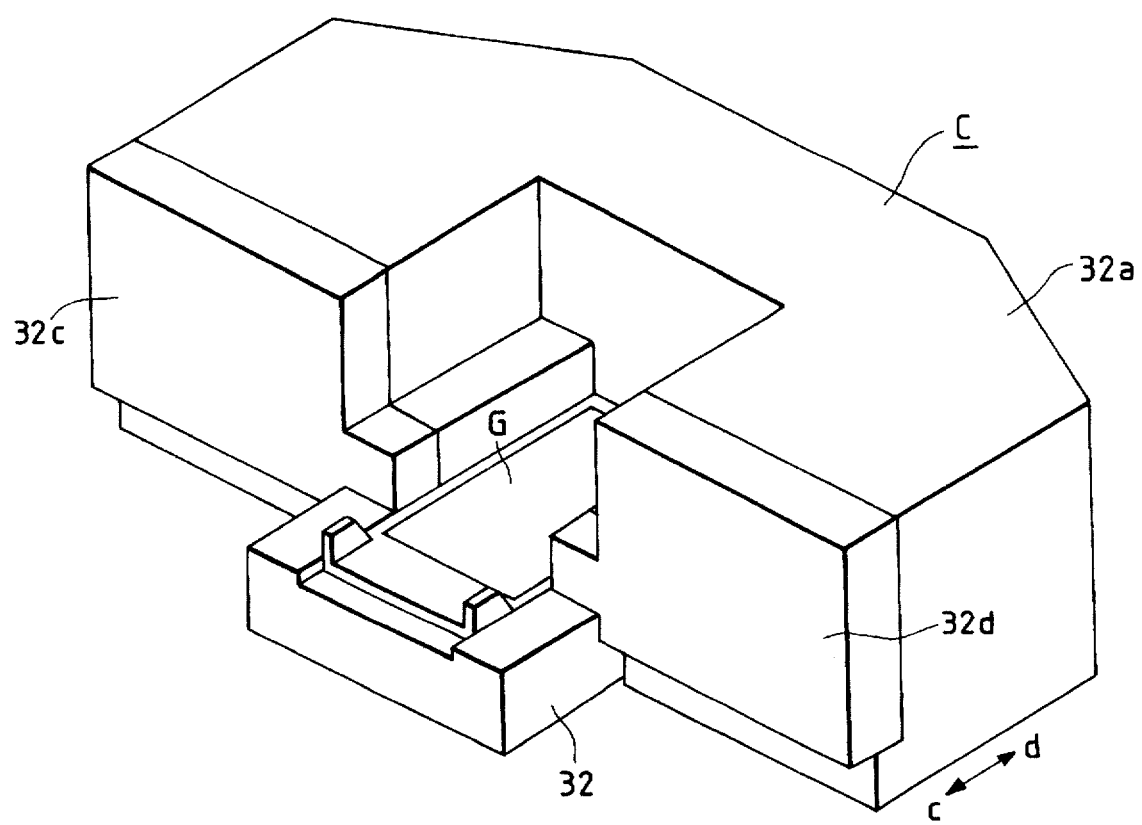
FIG. 3 is an external perspective view of the film carrier.
Figure 4:
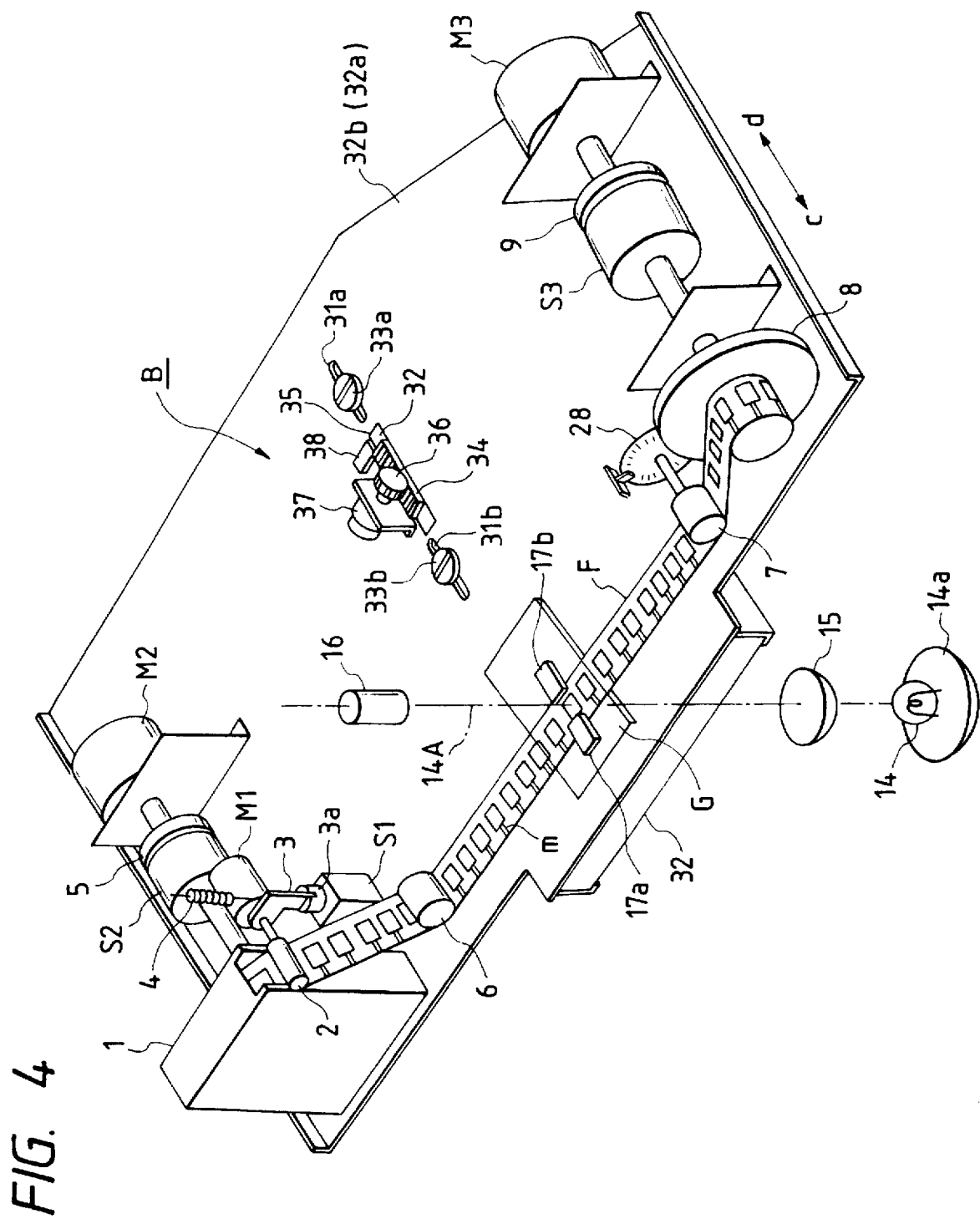
FIG. 4 is a perspective view of the internal structure of a carrier upper unit.

(2) Film carrier C (FIGS. 3 and 4)

FIG. 3 is an external perspective view of the film carrier C, which, in the present embodiment, is constructed as a unit detachable from the reader-printer. The film carrier C is composed of a carrier lower unit 32 and a carrier upper unit 32a. The carrier lower unit 32 is mounted on the reader-printer RP in a predetermined relationship thereto.

The carrier upper unit 32a is a movable unit which is slidable with respect to the carrier lower unit 32 in the width directions c, d of the film (a direction c toward front side of the main body of the reader-printer and a direction d toward rear side) by a moving mechanism to be explained later.

FIG. 4 is a perspective view showing the internal structure of the carrier upper unit 32a having a base plate 32b thereof. A film supply cartridge 1 houses a long microfilm F serving as an information recording medium and stored in a rolled form. The cartridge is loaded in a film loading portion of the upper unit 32a by opening a front door 32c (FIG. 3) thereof.

There are also provided a capstan roller 2 for driving the microfilm F in the cartridge 1; an extraction motor M1 for driving the capstan roller 2; a solenoid S1 for contacting the capstan roller 2 with the microfilm 1 through a support arm 3; and a spring 4 for separating the capstan roller 2 from the microfilm F by moving the support arm 3, a plunger 3a and the capstan roller 2.

There are further provided a film rewinding motor M2 for rotating a film spool in the cartridge 1; and a brake solenoid S2 for the film rewinding motor M2. The solenoid, when not energized, allows the rotation of the motor M2, but when energized, attracts a control plate 5 fixed on the motor shaft, thereby blocking the rotation of the motor M2.

There are further shown film guide rollers 6, 7; a winding reel 8 attached detachably to a mounting portion of the carrier upper unit 32a by opening a front door 32d (FIG. 3) in the present embodiment; a film winding motor M3 for rotating the winding reel 8; a brake solenoid S3 for the motor M3; and a braking plate 9. 14A indicates an optical center of an image projecting unit.

Though not illustrated, a guide plate for guiding the film is provided along a film feed path between the cartridge 1 and the winding reel 8.

Figure 11A:
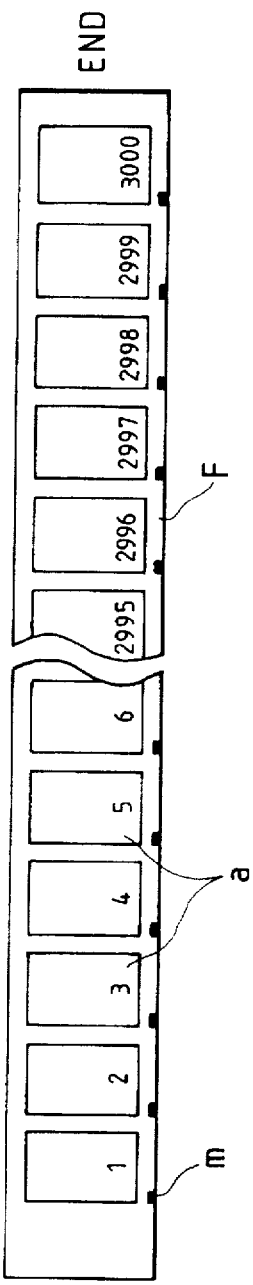
FIGS. 11A, 11B and 11C are views showing recording formats recorded with microimages on a rolled microfilm, respectively.
Figure 11B:
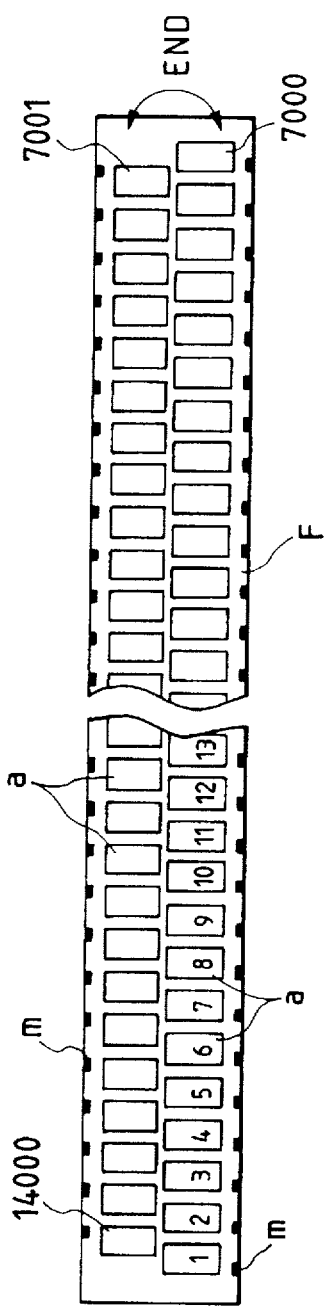
Figure 11C:
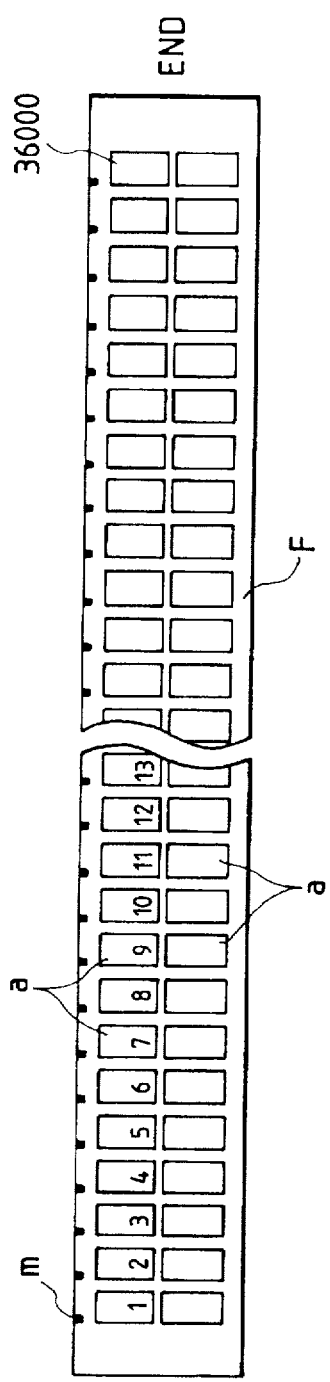

Mark detection means 17a, 17b are provided for detecting search (measuring) marks m provided at the side of the image frames on the microfilm F. In the present embodiment, the mark detection means 17a, 17b are provided on both sides of the film feed path in the projecting glass G, respectively. 17a for the A channel side and 17b for the B channel side. When the microfilm F is a duo film having the search marks m on both sides of the film as shown in FIG. 11B, the address counting is conducted with the signals of both mark detection means 17a, 17b in the A and B channels. When the microfilm F is a duplex or simplex film having the search marks m only on one side of the film, as shown in FIG. 11A or 11C, the address counting is achieved by the signals of the mark detection means 17a only.

Each of the mark detection means 17a, 17b, containing therein a photoelectric conversion element, is adapted to detect a mark m in response to the interruption of the light from the lamp 14 by the mark, in the course of forward or backward transportation of the microfilm F as will be explained later and to send a mark detection signal to process means 20 (FIG. 6) of the control system to be explained later.

A photoencoder 28 is provided for detecting the transport speed of the microfilm.

Figure 5:
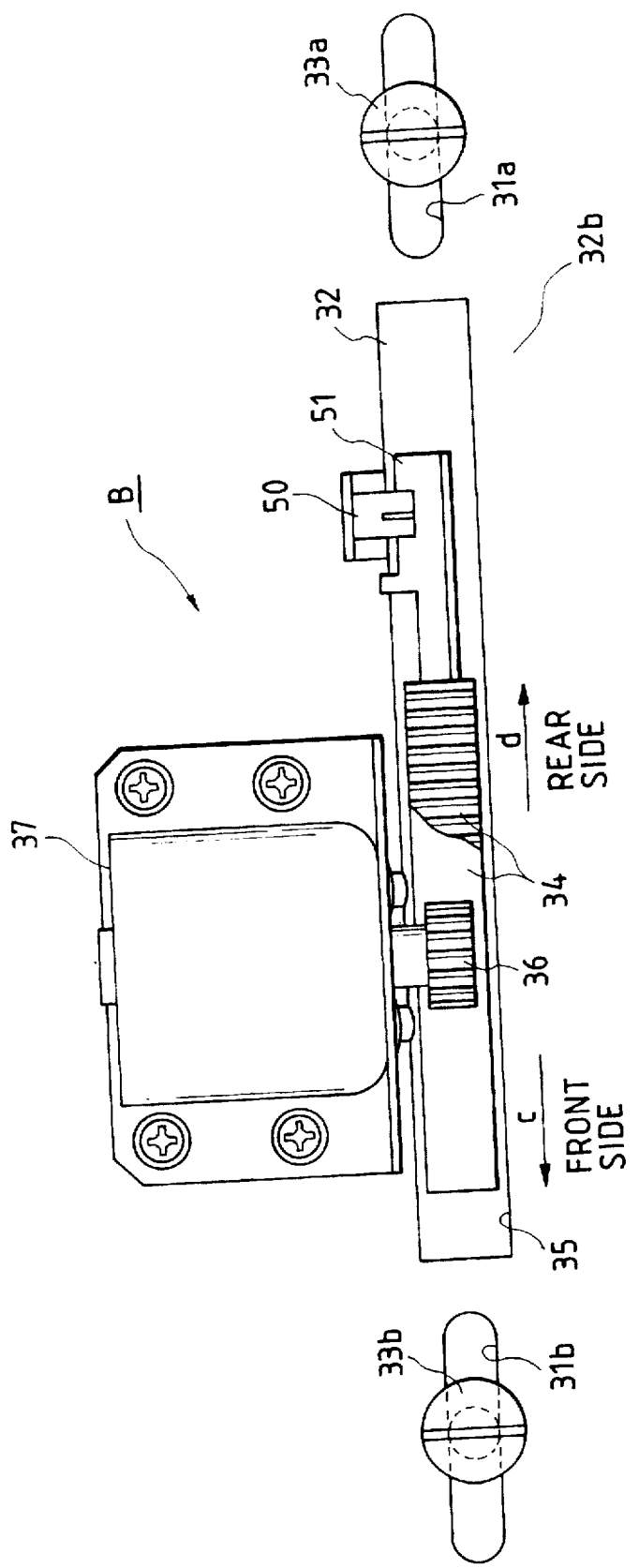
FIG. 5 is an enlarged plan view of a film width direction movement mechanism of the carrier.

(3) Film carrier mechanism (FIGS. 4 and 5)

In FIG. 4, there is provided a film carrier moving mechanism B (device for moving an information recording medium in a width direction thereof or shift mechanism), of which enlarged plan view is shown in FIG. 5.

The base plate 32b of the carrier upper unit 32a is provided with two elongated holes 33a, 33b which are elongated in the width directions c, d of the film and in which guide pins 33a, 33b are inserted and fixed by screwing into the carrier lower unit 32. Being guided by these elongated holes 31a, 31b and the guide pins 33a, 33b, the base plate 32b of the carrier upper unit 32a is freely slidable in the width direction of the film within the range of length of the elongated holes 31a, 31b.

Another elongated hole 35 formed between the above-mentioned elongated holes 31a and 31b of the base plate 32b of the carrier upper unit 32a and elongated in the width direction of the film, exposes therethrough a rack 34 fixed on the carrier lower unit 32.

A motor 37 is mounted on the base plate 32b of the carrier upper unit 32a. A pinion gear 36 is fixed on a shaft of the motor 37, mating with the above-mentioned rack 34.

By forward or reverse rotation of the motor 37, the pinion gear 36 rotates on the rack 34, whereby the base plate 32b of the carrier upper unit 32a is moved in a direction c or d in the width direction of the film, on the carrier lower unit 32. Stated differently, the upper unit 32a is relatively moved with respect to the apparatus main body such as reader toward the front side c or toward the rear side d.

Reference position detection means 38 is provided for detecting the absolute position of the movable carrier upper unit 32a and the stationary lower unit 32, and outputs a reference position detection signal to process means 20 to be explained later, thereby detecting the moving distance of the upper unit 32a from the reference position.

In the present embodiment, the reference position detection means 38 is composed of a transmissive sensor 50 provided on the base plate 32b of the movable carrier upper unit 32a and a light shielding plate 51, for the transmissive sensor 50, provided on the stationary carrier lower unit 32, wherein the transmissive sensor 50 is turned on and off by the movement thereof relative to the light shielding plate due to the film width direction movement of the carrier upper unit 32a, thereby detecting the absolute distance between the movable upper unit 32a and the stationary carrier lower unit 32.

(4) Control system

Figure 6:
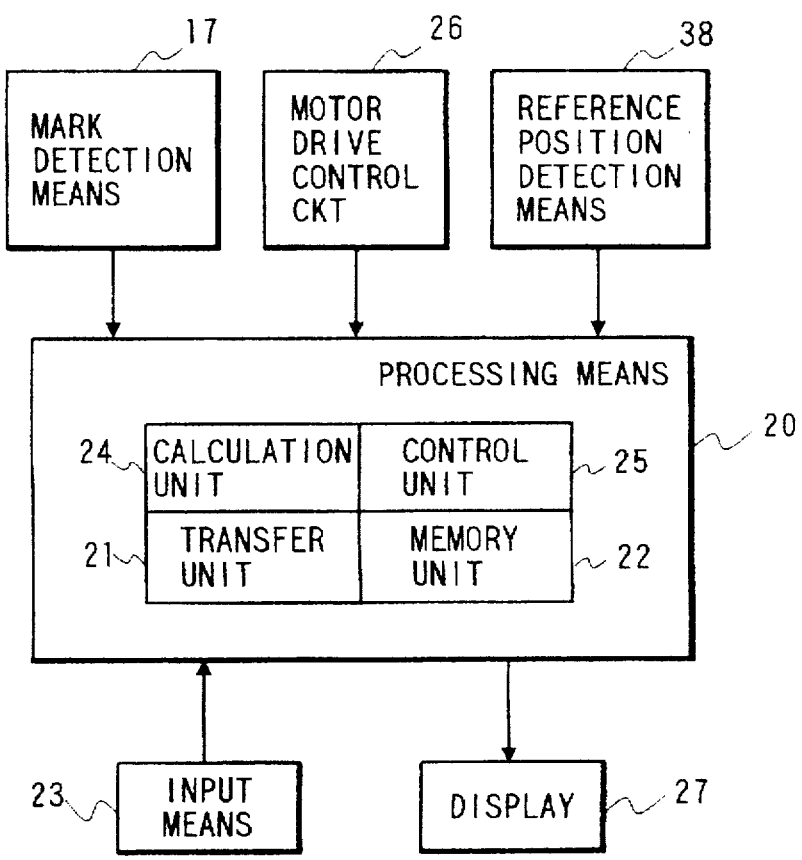
FIG. 6 is a block diagram showing the principal construction of a control circuit of the film carrier.

FIG. 6 is a block diagram showing construction of a main control circuit of the film carrier, wherein process means 20, such as a microprocessor, for processing the mark information of the microfilm F detected by the mark detection means 17, is composed of a transfer unit 21, a memory unit 22 for storing the mark information, a calculation unit 24 and a control unit 25.

The transfer unit 21 transfer the mark information detected by the mark detection means 17, to the memory unit 22 for counting, which stores the address of a designated image frame inputted from input means 23 such as a keyboard and the number of mark information transferred from the transfer unit 21.

The control unit 25 effects overall control (for example trouble shooting) in the process means 20, and also serves as motor drive control means for transporting the microfilm F. It furthermore serves as reference position detection means and motor drive control means, for moving the film carrier C in the width direction of the microfilm F according to the result of processing of the mark information.

The calculation unit 24 compares the image frame number inputted from the input means 23 and the mark information stored in the memory unit 22, and outputs the result of comparison to the control unit 25. A display unit 27 is provided for displaying the address of the image frame and the like.

(5) Function of film feeding unit

When the cartridge 1 is loaded in the loading unit of the upper unit 32a of the film carrier C and a desired image frame number is inputted by the operator through the input means 23, the motor M1 is driven by the motor control circuit 26 and the solenoid S1 is energized, whereby the capstan roller 2 is brought into contact with a leader tape of the microfilm F protruding from the cartridge 1 to extract the microfilm F from the cartridge 1. The front end of the leader tape is transported along the film feed path through the film guide roller 6, the projecting glass portion A, the film guide roller 7 and the film winding reel 8. As the front end of the leader tape approaches the winding reel 8, the winding motor M3 is activated, whereby the leader tape is wound on the winding reel (automatic loading).

Then, the motor M1 and the solenoid S1 are deactivated, but the microfilm F continues to be transported in the forward direction from the cartridge 1 to the winding reel 8 by the rotation thereof.

In the course of such transportation of the microfilm F, the marks m detected by the mark detection means 17 are counted by the memory unit, and the counted value is compared in the calculation unit 24, after a predetermined time, with the frame number inputted in advance, and if both coincide, the control unit 25 generates a stop signal to activate the brake solenoid S3 for controlling the winding shaft of the winding reel 8. Similarly, the solenoid S2 controls the shaft of the motor M2 to suppress the inertial rotation of the feeding spool in the cartridge 1, whereby the feeding of the microfilm F is terminated and the desired image frame portion thereon is searched and stopped on the projecting glass A (auto search operation). Thus, the microimage of such image frame portion is projected through the projection lens 16 onto the screen 30.

Also, in the backward transportation of the microfilm F from the winding reel 8 to the cartridge 1, there is executed the automatic search operation for the desired image frame portion of the microfilm F.

(6) Movement control of film carrier C

In case the microfilm F is a simplex type microfilm as shown in FIG. 11A, the longitudinal movement of the microfilm F is executed in an order similar to that of image recording. As such simplex type microfilm F has the marks m of the microimages only on one channel side, the number of such marks m is counted up by the signals from the mark detection means 17a or 17b. In contrast to the duo type microfilm as shown in FIG. 11B, the channel can be identified even before completion of the search since there is only one channel.

Figure 7A:
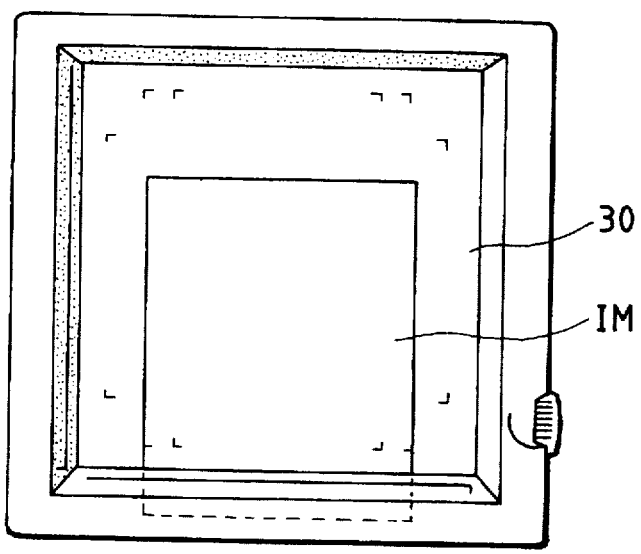
FIGS. 7A and 7B are views showing microimages of a simplex type microfilm projected on a screen, respectively, FIG. 7A showing a state with an image lacking and FIG. 7B showing a state without such image lacking.
Figure 8A:
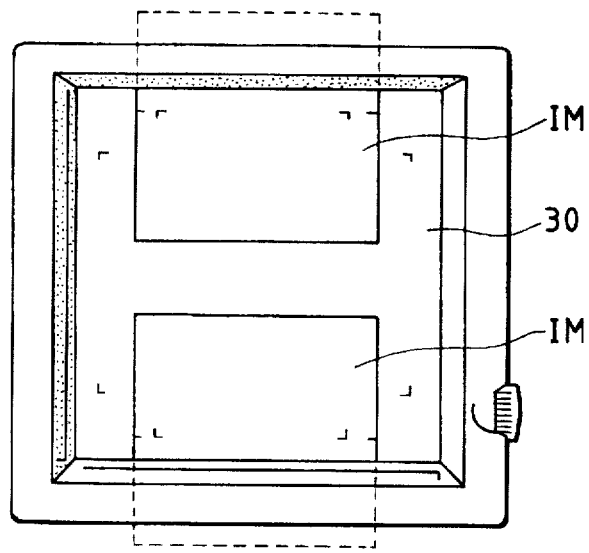
FIGS. 8A, 8B and 8C are views showing microimages of a duo type microfilm projected on a screen, respectively, FIG. 8A showing a state with image lacking in the projected microimages of both channels, FIG. 8B showing a state without an image lacking in one of the projected images, and FIG. 8C showing a state without an image lacking in the other of the projected images.
Figure 8B:
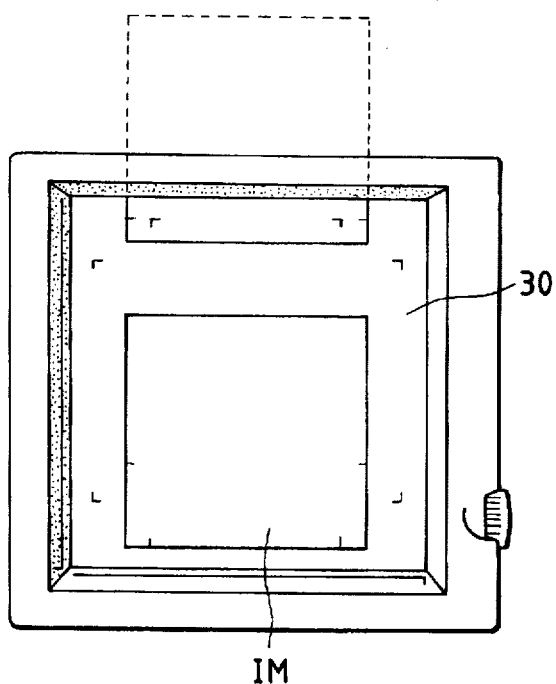
Figure 8C:
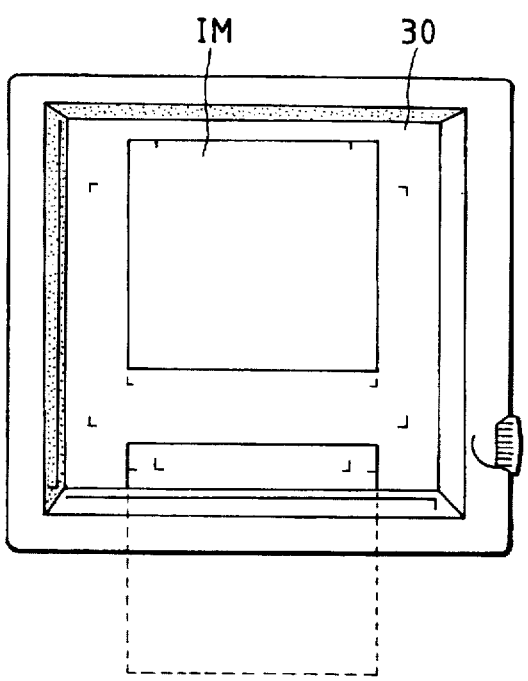

In a state where the film carrier C is installed on the read-printer RP, the microimage IM recorded on the microfilm F and illuminated by the lamp 14 is projected onto the screen 30. However, in case the previously projected microimage is on a duo type microfilm, the projected image may protrude from the screen 30 as shown in FIG. 7A. This is because the film carrier C is moved upon projecting the duo type microfilm on the screen 30, from a state as shown in FIG. 8A where the microimages of two channels are both partly projected on the screen 30 to a state as shown in FIG. 8B or 8C where the microimage IM of either channel is projected on the screen 30.

Therefore, in order to accommodate both the duo type microfilm and the microfilm of other types, the film carrier C is rendered movable in the width direction of the microfilm F by means of the aforementioned film carrier movement mechanism (FIG. 5), thereby varying the relative position between the microfilm F and the screen 30.

Figure 7B:
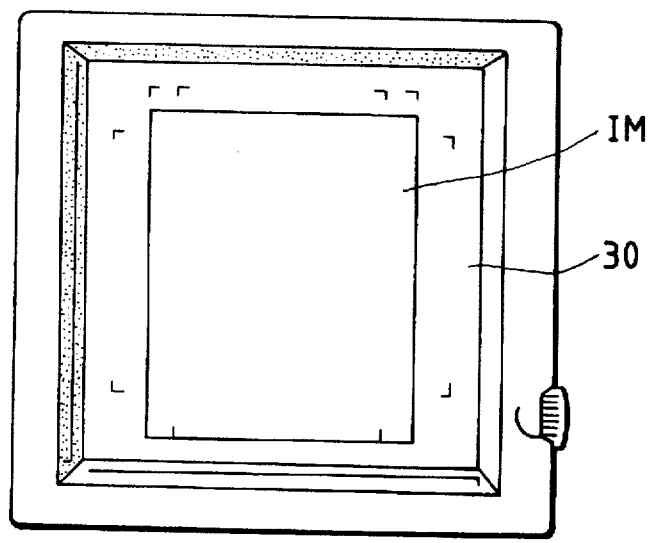

Even when the simplex type microfilm is used after the duo type microfilm has been used the microimage IM can be projected without lacking on the screen 30 as shown in FIG. 7B.

Specifically, the motor 37 (FIG. 5) is controlled to move the film carrier C by a predetermined distance from the reference position detected by the reference position detection means 38, so as to project the designated microimage on the screen 30. As a result, the microimage IM can be projected as shown in FIG. 7B on the screen 30.

More specifically, the process means 20 (FIG. 6) measures the drive distance of the motor 37 in order to measure the moving distance of the carrier C from the reference position detected by the aforementioned reference position detection means 38, and stores the current position in the width direction of the microfilm F by performing calculation with the drive time of the motor 37 or the number of pulses generated at the rotation thereof. Then, when the microimage search is started, and if the previous film is of the duo type but the current film is identified as another type, the motor 37 is driven in a predetermined direction by a predetermined distance from the reference position, thereby moving the film carrier C in the width direction of the microfilm F. Data for the distance to be moved of the film carrier as an amount of movement of the film carrier can be inputted from the input means 23.

The reference position detection means 38 is positioned so as to identify the central position in the width direction of the microfilm, so that it is always passed when the film carrier C is moved by the motor 37, that is, moved in the absolute position.

The reference position detection means 38 may also be positioned toward an end in the width direction of the microfilm as long as the position in the width direction can be identified, but the movement of the film carrier C has always to be made through the reference position.

In the foregoing description, the movement of the film carrier C is conducted when the film type is identified after the start of the search, but it may also be executed when the search is completed.

Since the position of the recorded image on the microfilm F in the width direction of the microfilm F is different due to the difference in recording format, recording image magnification or the like, the moving distance from the reference position corresponding to the type of the film can be inputted from the input means 23 and the corresponding moving distance data to the input type of the film can be stored in the memory unit.

It is also possible to provide the input means 23 with mode keys corresponding to the different film types, and a mode key corresponding to the film type used is operated to read the movement distance data corresponding to the actuated mode key from the memory unit 22 and to drive the motor 37 based on such read data, thereby moving the film carrier to a predetermined position.

As explained in the foregoing, in the image searching apparatus of the present embodiment including a film carrier for supporting a microfilm F on which microimages are recorded, and film carrier width direction movement means for moving the film carrier in the width direction of the microfilm, the film carrier is moved in the width direction of the microfilm when the moving position in such width direction is identified, thereby achieving the positioning in the width direction of the microfilm for projecting a desired microimage on the screen without trouble.

Also, there is defined a reference position for the movement of the film carrier, and there are further provided means for inputting an amount of movement of the film carrier from the reference position in the width direction of the microfilm, and a memory device for storing such amount of movement. Thus, even for a microfilm with a different recording format, once the amount of movement from the reference position is set by the input means, the film carrier is so moved as to project the microimage at a predetermined position by mere searching operation. Consequently an efficient microimage projecting operation can be achieved, regardless of the standard of recording of the microfilm F, by a simple construction including means for transversally moving the microfilm and a reference position sensor.

Figure 9:
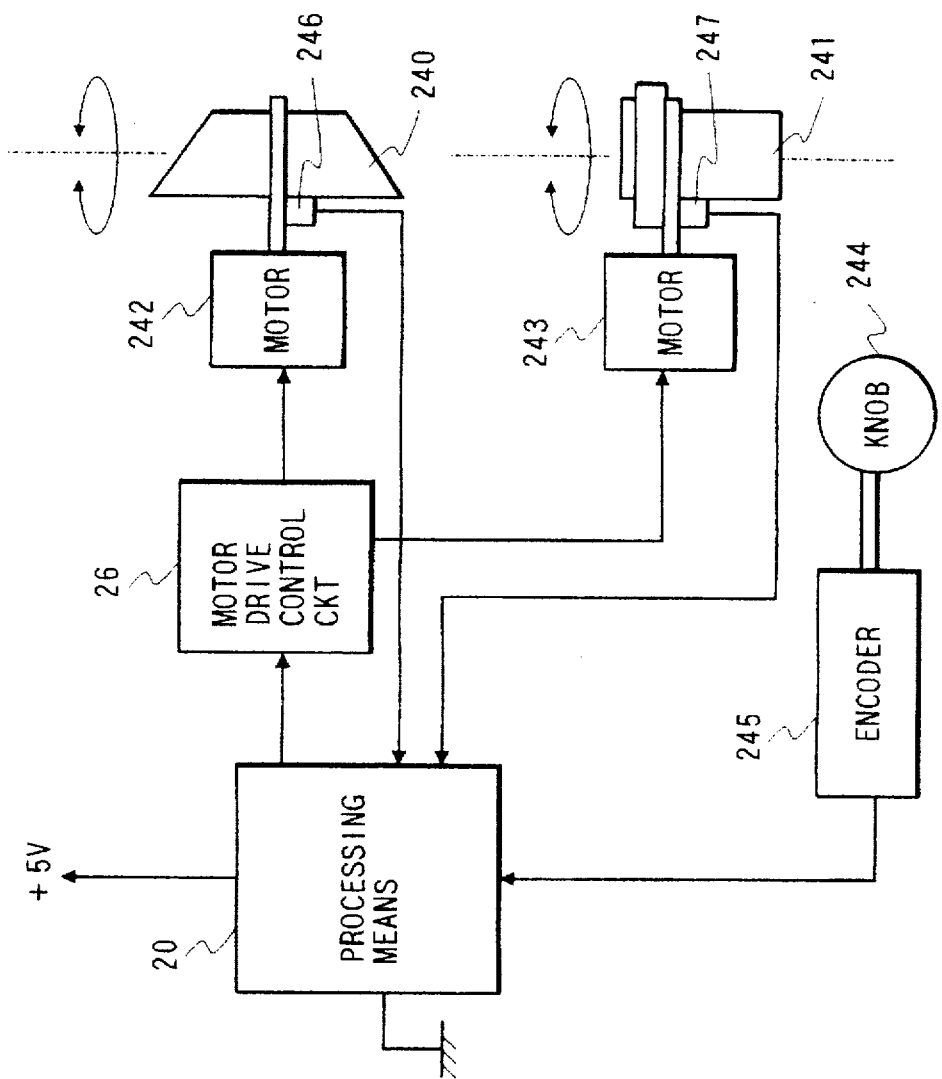
FIG. 9 is a view showing drive means for a prism lens for image rotation and a zoom lens for image projection, and detection means for detecting the image rotation angle and the projection magnification.
Figure 10A:
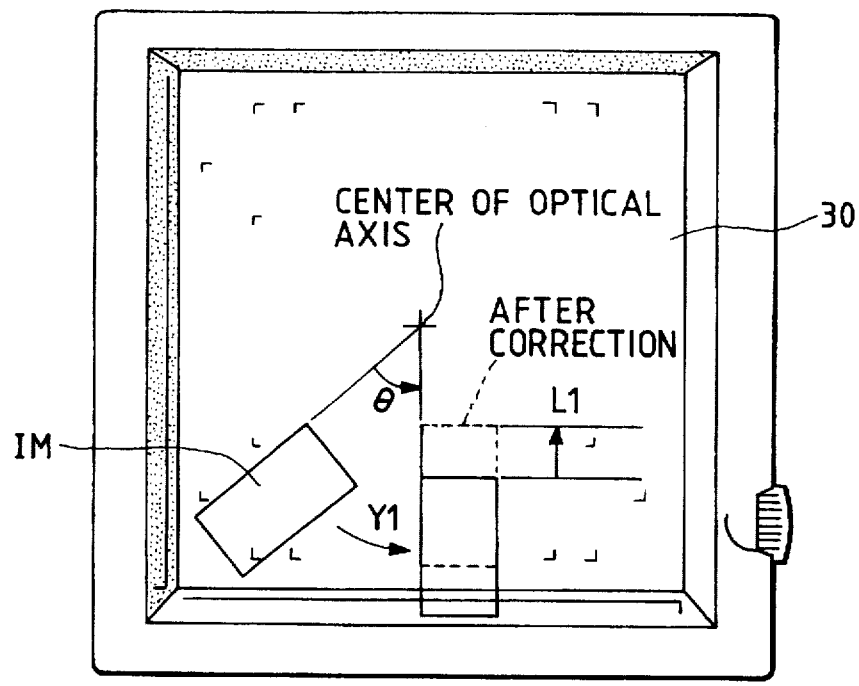
FIG. 10A is a view showing an image movement by a rotation of the prism lens.
Figure 10B:
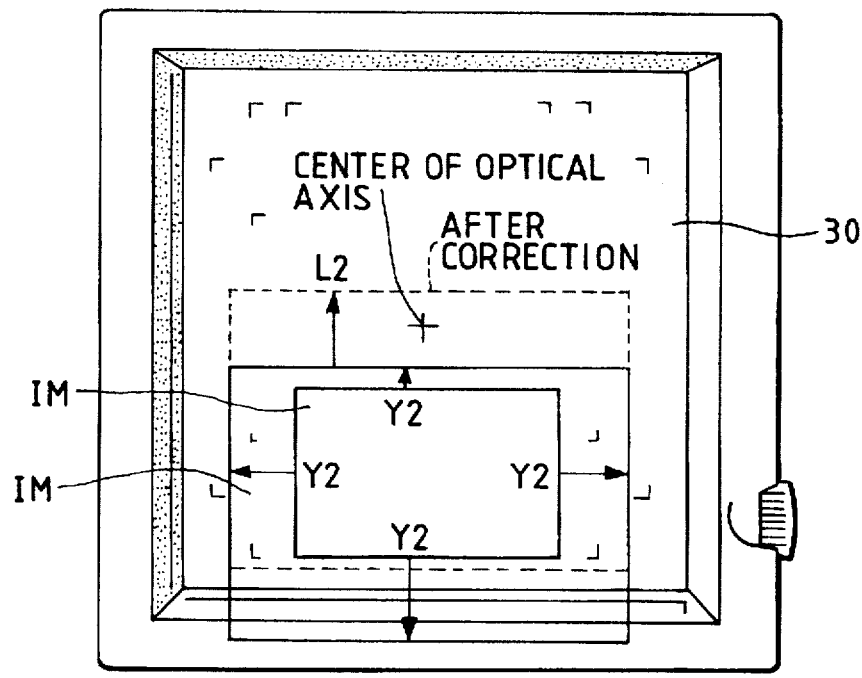
FIG. 10B is a view showing an image movement by a rotation of the zoom lens.

[Second Embodiment] (FIGS. 9, 10A and 10B)

As explained in the foregoing first embodiment for projecting the microimage of a simplex type microfilm as shown in FIG. 11A on the screen 30 if the previous film is a duo type microfilm, the film carrier C is moved by the shift mechanism B to a position corresponding to such simplex type microfilm F.

However, in case a prism lens 240 as image rotation means is provided in the projecting optical path for image rotation as shown in FIG. 9, the projected image position moves as indicated by Y1 if the prism lens 240 is rotated in order to correct the inclined projected microimage IM.

In the present embodiment there is, therefore, provided correction means for varying the shift amount of the film carrier C in the width direction of the film according to the image rotation or the projecting magnification, and correcting the relative position between the film and the screen.

FIG. 9 shows drive means for a prism lens 240 for image rotation and for a projecting zoom lens for image projection, and means for detecting the rotation angle and the projecting image magnification. There are shown a motor 242 for rotating the prism lens 240; a motor 243 for rotating a zoom lens 241; rotation angle detection means 246 for the prism lens 240; rotation angle detection means 247 for the zoom lens 241; a manual knob 244; and an encoder 245. A forward or reverse rotation of the manual knob 244 causes the prism lens 240 or the zoom lens 241 to be controlled and rotated by an electric drive mechanism at a rotation angle corresponding to the rotation angle of the manipulation of the manual knob 244.

More specifically, when the knob 244 is rotated, the angle of rotation is read by the encoder 245 and the information on the rotation angle is transmitted to the process means 20 controlling the apparatus. The process means 20 converts the number of output pulses of the encoder 245, released in response to the rotation of the knob 244, into the rotation angle of the knob 244, then calculates the rotation angle of the prism lens 240 or the zoom lens 241 based on the information of such rotation angle, and sends a drive signal to the motor drive control circuit 26 for the prism lens motor 242 or the zoom lens motor 243 thereby rotating the prism lens 240 or the zoom lens 241 by an angle corresponding to the angle of manipulation of the knob 244.

The rotation of the prism lens 240 or that of the zoom lens 241 can be selected for example by an unrepresented selection key or the like.

When the prism lens 240 is rotated, the prism lens rotation angle detection means 246 detects angular information, which is then supplied to the process means 20. Also, when the zoom lens 241 is rotated, the zoom lens rotation angle detection means 247 detects angular information, which is then supplied to the process means 20.

FIG. 10A shows an image movement when a microimage IM projected on the screen 30 is rotated by the prism lens 240. A rotation of the prism lens 240 causes a movement of the microimage IM projected on the screen 30, in a direction Y1.

FIG. 10B shows an image movement when the image is enlarged by a rotation of the zoom lens 241. A rotation of the zoom lens 241 causes movement of the microimage IM projected on the screen 30 in a direction Y2.

In the above-explained construction, when the film carrier C is moved in the width direction of the microfilm, the process means 20 corrects the moving amount by a calculation based on the rotation angle detected by the prism lens rotation angle detection means 246 and the rotation angle detected by the zoom lens rotation angle detection means 247.

That is, when the zoom lens 241 is rotated for image enlargement to a desired magnification, the magnification of projection varies as shown in FIG. 10B to become enlarged image IM', so that the enlarged image IM' moves to a position indicated by arrows L2, thereby protruding from the screen 30. Therefore, the process means 20 calculates the moving amount L2, based on the detected magnification and the detection means for detecting whether the image is projected without protruding from the screen with an unrepresented image position sensor, and corrects the moving amount of the film carrier C.

Also, when the prism lens 240 is rotated for correcting an inclined image, the projected image rotates as shown in FIG. 10A and may protrude from the screen 30. Therefore, the process means 20 calculates the moving amount L1 based on the detected angle θ and the detection means for detecting whether the image is projected without protruding from the screen with an unrepresented image position sensor. The moving amount L1 is calculated from the projection magnification and is used for correcting the moving amount of the film carrier.

In the present embodiment, the prism lens 240 and the zoom lens 241 are driven with motors, but they may also be driven manually if the rotation angle of the image and the magnification of projection can be detected.

Also, the projected image position may be deviated because deviation in the optical axis occurs in the prism lens 240 due to rotation. It is, therefore, possible also to detect the amount of deviation of the optical axis calculated from the rotation angle of the prism lens 240 by unrepresented optical axis deviation detection means, and to add such amount of displacement to the correction value.

In the duo type microfilm, the recording direction of the image varies depending on the channel, so that the image projected on the screen 30 may become inverted. It is, therefore, possible to automatically rotate the prism lens 240 to obtain an erect projected image and to add the amount of deviation generated in such image rotation to the correction value.

The film carrier can be more exactly moved to the predetermined position by adding correction value depending on the rotation angle of the projected image and the magnification of projection to the moving amount, so that the desired image can be securely projected on the screen 30.

As explained in the foregoing, in the information searching apparatus provided with means for transporting a long information recording medium and searching and placing a desired image frame portion at a predetermined position, such as the rolled microfilm carrier provided in the microfilm reader or the reader-printer, and means for moving such searching means in the width direction of the microfilm, the present invention allows (1) to achieve positioning of a desired image information portion relative to a predetermined position in the width direction of the information recording medium with no trouble by moving the apparatus in the width direction, (2) to project a desired image information portion efficiently regardless of recording standard of the image information on the information recording medium, and (3) to securely project a desired image information portion on a screen, thereby attaining the aforementioned objects.

[Third Embodiment]

Figure 12:
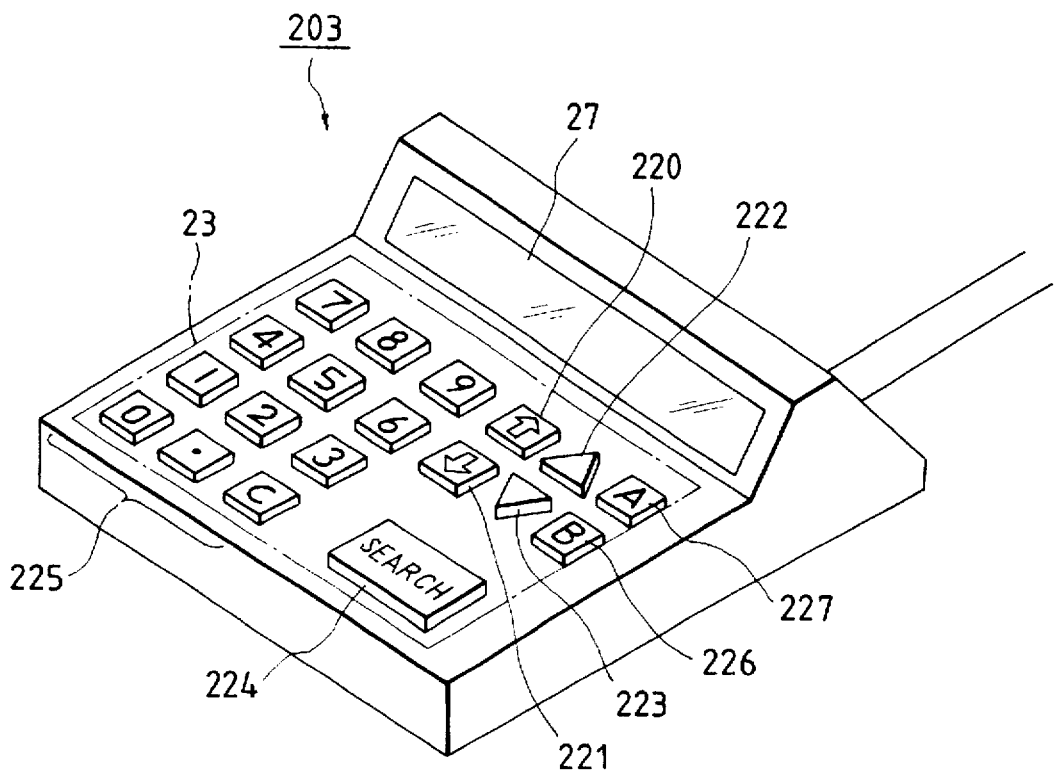
FIG. 12 is a perspective view of a control device.

(1) Control device 203 (FIG. 12)

FIG. 12 is a perspective view of a control device 203, which is composed of input means 23 and display means 27. The input means includes numeral keys 225 for inputting an address for the image on the microfilm, and a search key 224 for instructing the search. Usually, the image address can be set by inputting a desired address number with the numeral keys 225 and then depressing the search key 224.

Carrier movement keys (↑ key and ↓ key) 220, 221 are provided for moving the carrier C in the width directions c, d to the designated position.

Carrier position fine adjustment keys (Δ key and ∇ key) 222, 223 are provided for fine adjustment of the image in the width direction. The depression of the key 222 causes a movement of the carrier C toward the rear side d with respect to the apparatus main body such as reader, whereby the projected image moves upwards on the screen 30. On the other hand, the depression of the key 223 causes a movement of the carrier C toward the front side c with respect to the apparatus main body such as reader, whereby the projected image moves downwards on the screen 30.

There are also provided an A key 227 for designating a forward address of the image, and a B key 226 for designating a backward address of the image.

Figure 14:
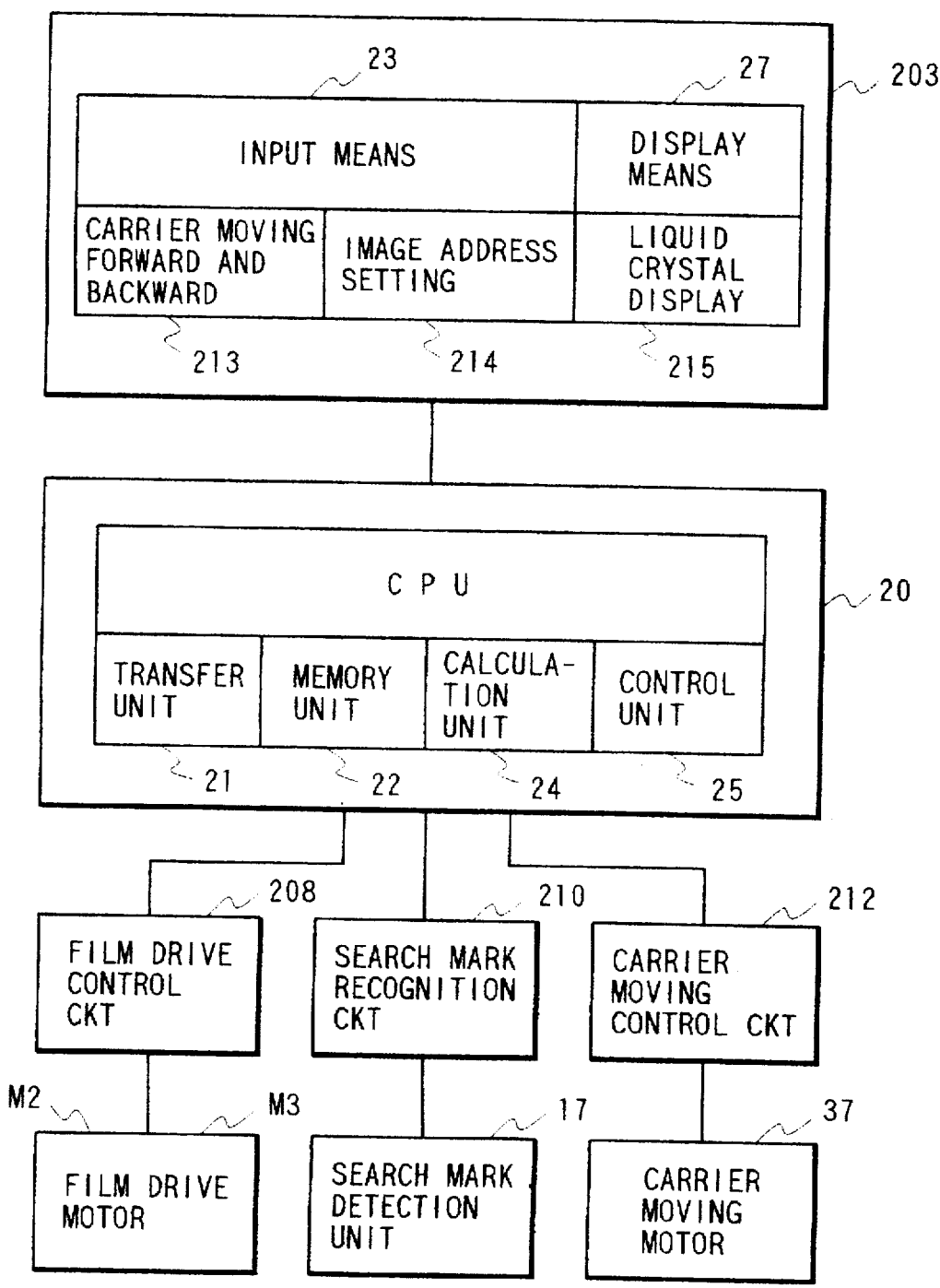
FIG. 14 is a block diagram showing the principal circuit construction of the film carrier.

(2) Control system (FIG. 14).

FIG. 14 is a block diagram showing the principal construction of the control circuit of the film carrier, wherein a process circuit 20 such as a microprocessor for processing the mark information of the microfilm F detected by a recognition circuit 210, is composed of a transfer unit 21, a memory unit 22 for storing the mark information, a calculation unit 24 and a control unit 25.

The transfer unit 21 transfers the mark information detected by the search mark recognition circuit 210 to the memory unit 22, which stores the address of a designated image frame inputted from input means 23 such as a keyboard of a control unit 203 and the mark information transferred from the transfer unit 21.

The control unit 25 effects overall control (for example, trouble shooting) in the process means 20, and also serves for controlling a film drive control circuit 208, connected to motors M2, M3 for transporting the microfilm F. It furthermore serves for controlling a carrier movement control circuit 212 connected to a carrier moving motor 37, for moving the film carrier C in the width direction of the microfilm F according to the result of processing of the mark information or in response to an instruction from the input device.

The calculation unit 24 compares and calculates the image frame number inputted from the input means 23 and the mark information stored in the memory unit 22, and sends the result of comparison to the control unit 25.

The control unit 203 is composed of input means 23 and display means 27, wherein the input means 23 is composed of an input 213 for forward/backward carrier movement and an input 214 for setting an image searching address, while the display means 27 is composed, for example, of a liquid crystal display unit 215 for displaying the image frame address or the like.

(3) Function of film feeding unit

When the cartridge 1 is loaded in the loading unit of the upper unit 32a of the film carrier C and a desired image frame number is inputted by the operator through the input means 23, the motor M1 is driven by the control unit 25 and the solenoid S1 is energized, whereby the capstan roller 2 is brought into contact with a leader tape of the microfilm F, protruding from the cartridge 1 to extract the microfilm F from the cartridge 1. The front end of the leader tape is transported along the film feed path through the film guide roller 6, the projecting glass portion G, the film guide roller 7 and the film winding reel 8. When the front end of the leader tape approaches the winding reel 8, the winding motor M3 is activated, whereby the leader tape is wound on the winding reel 8 (automatic loading).

Then, the motor M1 and the solenoid S1 are deactivated, but the microfilm F continues to be transported in the forward direction from the cartridge 1 to the winding reel 8, by the rotation thereof.

In the course of such transportation of the microfilm F, the marks m detected by the mark detection means 17 are compared with a frame number inputted in advance in the calculation unit 24, and, in case of coincidence, the control unit 25 generates a stop signal to activate the brake solenoid S3 for controlling the winding shaft of the winding reel 8. Similarly, the solenoid S2 controls the shaft of the motor M2 to suppress the inertial rotation of the feeding spool in the cartridge 1, whereby the feeding of the microfilm F is terminated and the desired image frame portion thereon is searched and stopped on the projecting glass G (auto search operation). Thus, the microimage of such image frame portion is projected through the projection lens 16 onto the screen 30.

Also, in the backward transportation of the microfilm F from the winding reel 8 to the cartridge 1, there is executed the automatic search operation for the desired image frame portion of the microfilm F.

(4) Transversal movement control of film carrier C (FIGS. 15 to 21)

Figure 13A:
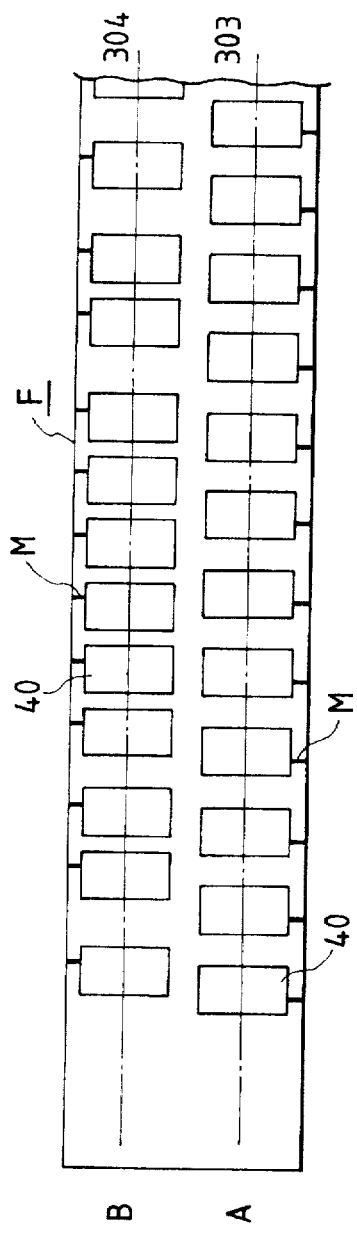
FIGS. 13A, 13B and 13C are views showing recording formats recorded with microimages on a rolled microfilm, respectively, in a duo film, a duplex film and a simplex film.

In the duo film shown in FIG. 13A, the center of the image in the channel A in the forward recording direction is indicated by 303, and the center of the image in the channel B in the backward recording direction is indicated by 304.

Figure 13B:
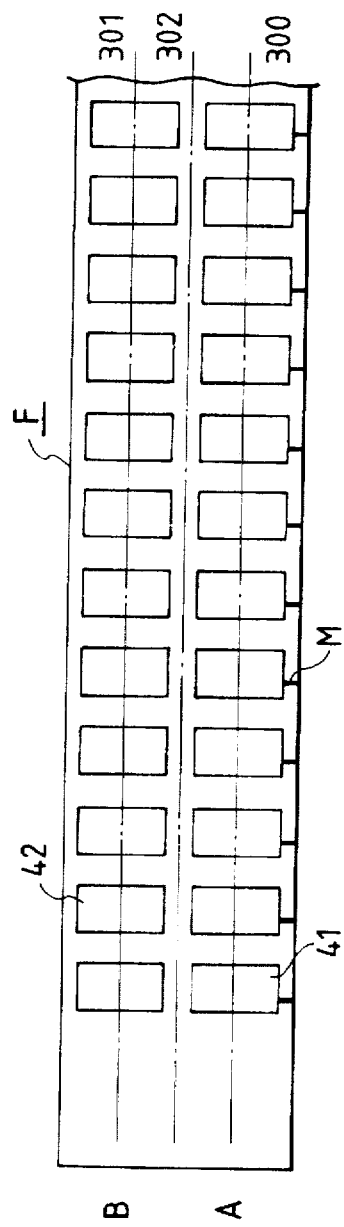

Also, in the duplex film shown in FIG. 13B, the center of the front side image 41 (channel A) is indicated by 300, the center of the image of the rear side image 42 (channel B) is indicated by 301, and the intermediate position between the images 41 and 42 is indicated by 302.

Figure 13C:
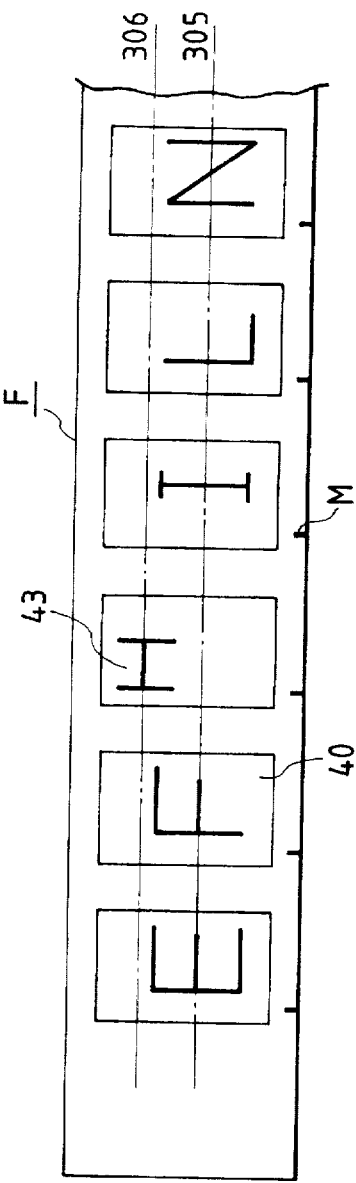

Also, in the simplex film shown in FIG. 13C, the center of the image is indicated by 305, and the center of the specified image is indicated by 306.

Figure 15:
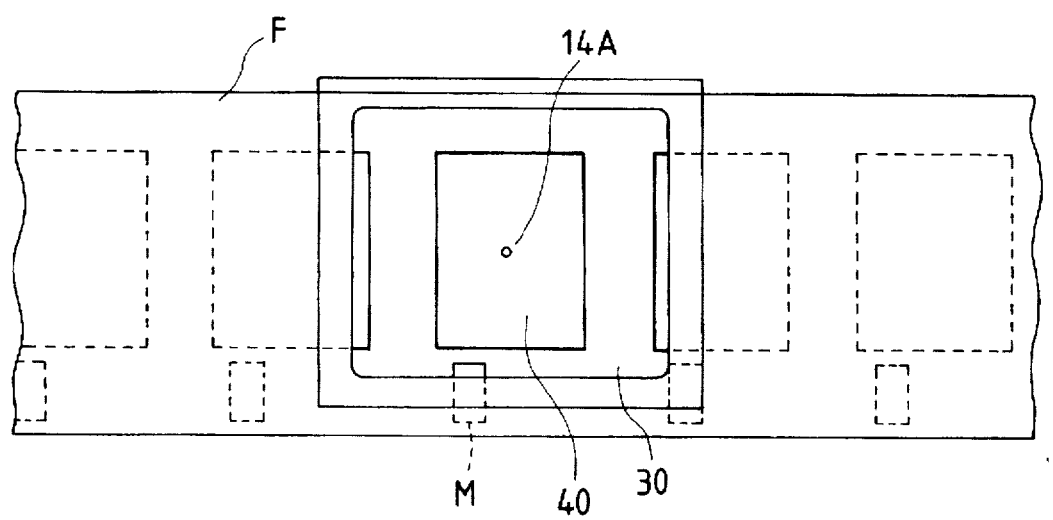
FIG. 15 is a schematic view of a microfilm image, in case of a simplex film, projected on a screen.

As explained in the foregoing, the image of the film positioned on the projecting glass portion G is focused and projected in magnified manner on the reader screen 30 through the reader optical system. The optical center 14A of the image projecting unit coincides with the center of the screen 30. FIG. 15 shows the imaginary state, around the screen 30, of thus projected microfilm F in magnified manner. The microfilm F in this example is a simplex film.

When the carrier position fine adjustment key 222 or 223 (FIG. 12) of the control device 203 is depressed in this state, the film carrier C moves with a low speed in the width direction of the film toward the rear side d or the front side c of the apparatus main body such as reader, whereby the projected image on the screen 30 moves upwards or downwards.

8 Control example 1] (FIGS. 16A to 18)

Figure 16A:
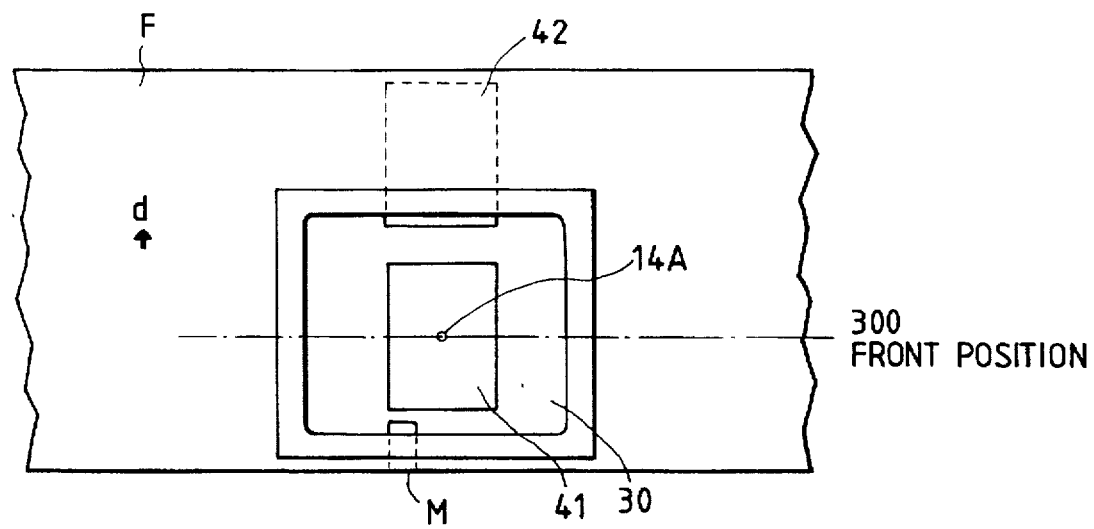
FIGS. 16A, 16B and 16C are views showing the position control of the images of a duplex film projected on a screen.
Figure 16B:
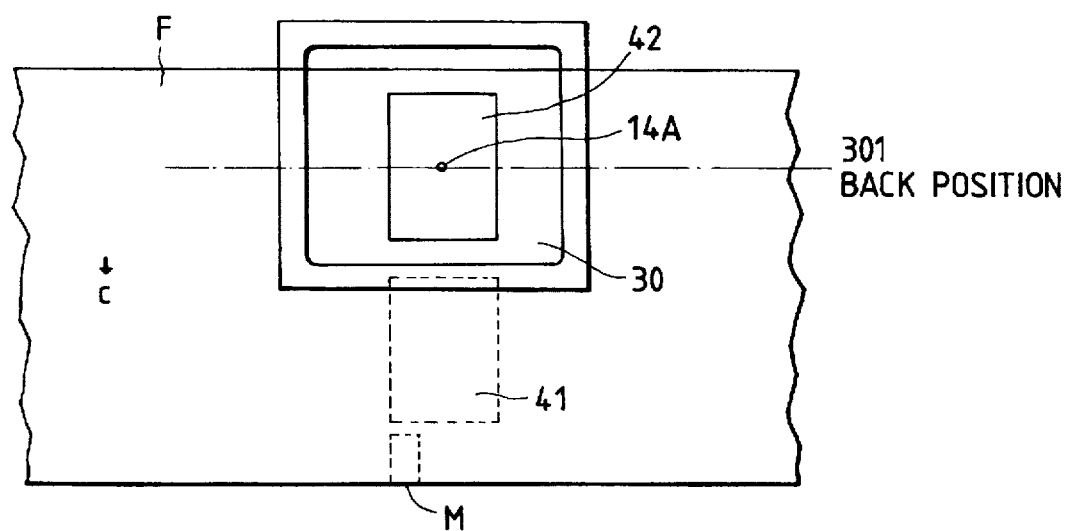
Figure 16C:
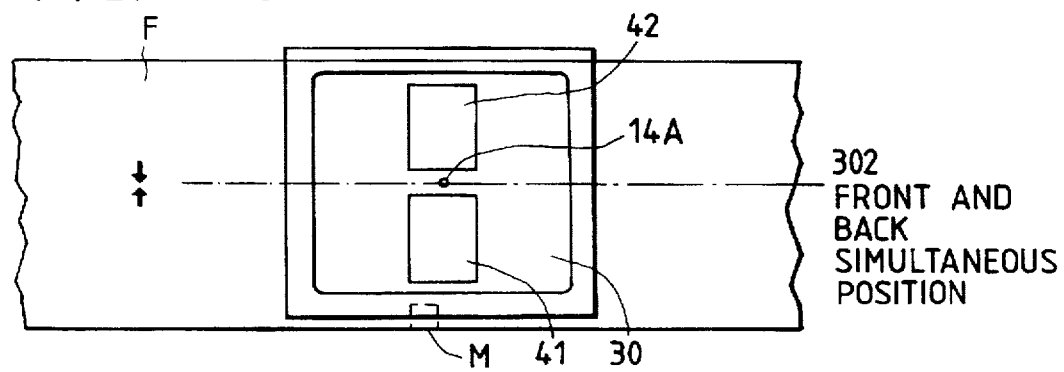

FIGS. 16A to 16C illustrate states of projection of a duplex film on the screen 30. The duplex film usually has a front image 41 and a rear image 42 of the object recorded in parallel in the width direction of the film, and either of such images or both images are projected on the screen 30, depending on the size of the object and the image reduction rate at the recording. The optimum stop position of the carrier C is different in each of these cases, as will be explained with reference to the above-explained drawings and a flow chart.

FIG. 16A shows a case where only the front image 41 (closer to the search mark M) of the duplex film is projected on the screen 30 because of a large projecting magnification. In order to project the front image 41 on the screen 30 the microfilm carrier C is moved from the center to the rear (direction of arrow d) such that the center 300 of the front image 41 coincides with the optical center 14A.

FIG. 16B shows a case where 301 of the rear image 42 (opposite to the search mark) coincides with the optical center 14A similarly by moving the microfilm carrier C from the center to the front (direction of arrow c).

FIG. 16C shows a case where the front and rear images 41, 42 of the duplex film are projected on the screen 30 simultaneously because of a small projecting magnification.

In order to project both images at the same time the microfilm carrier C is moved as indicated by an arrow toward the center such that an intermediate position (front and back simultaneous position) 302 between the front and rear images 41 and 42 coincide with the optical center 14A.

Figure 17:
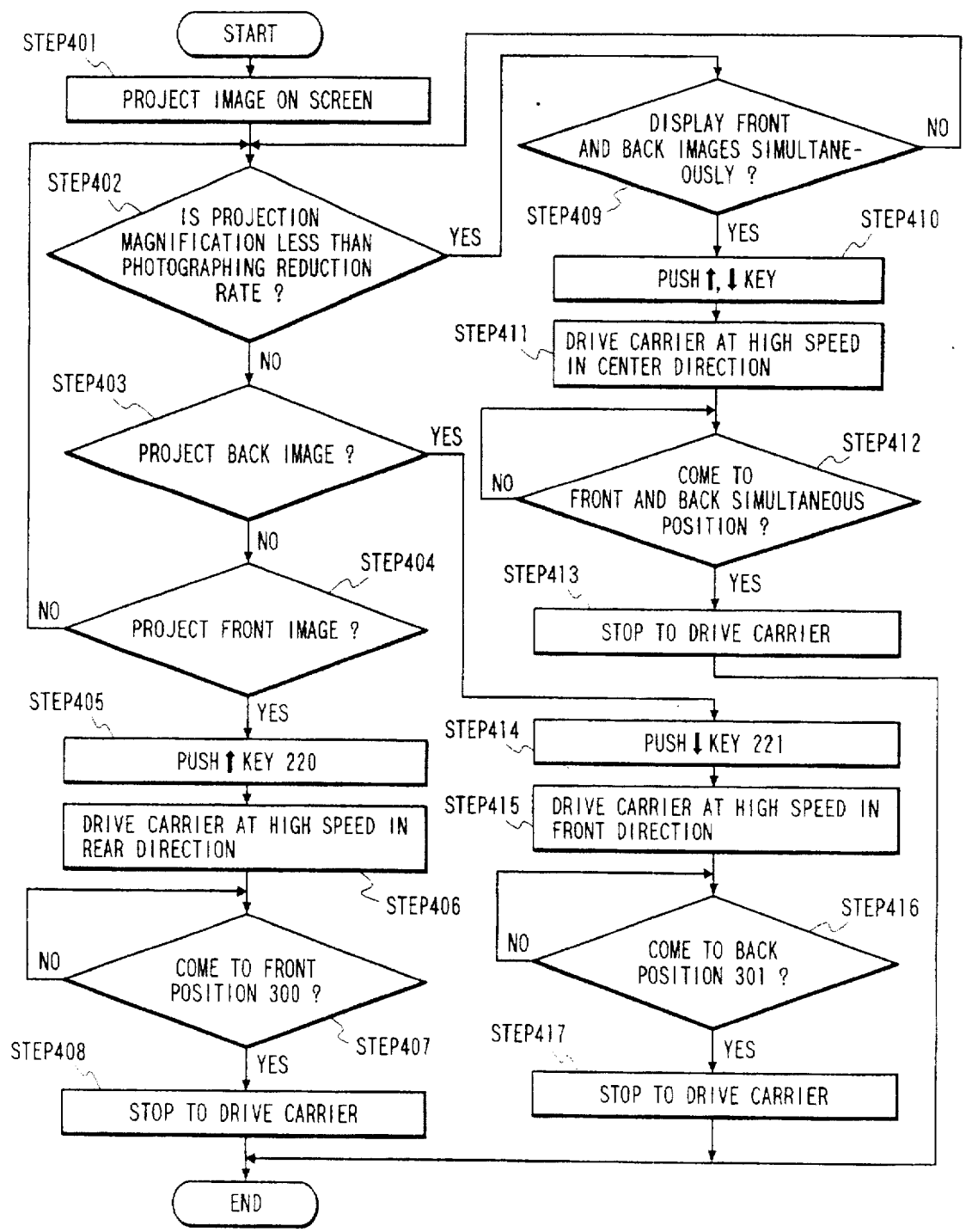
FIG. 17 is a flow chart showing the control sequence of such position control.

With reference to a flow chart in FIG. 17, which shows a case of simultaneously projecting the front and rear images 41 and 42 as shown in FIG. 16C when the projecting magnification on screen 30 is smaller than the image reduction rate at recording on the film.

1) At first, a step 401 projects the images of the duplex film onto the screen 30.

2) Then, a step 402 confirms the projecting magnification, and, if it is less than the image reduction rate at recording, it is judged that the front and rear images are to be simultaneously projected.

If the projecting magnification is equal to the image reduction rate at recording (namely, projecting by equal magnification), there is judged whether the front image 41 or the rear image 42 is to be projected (steps 403 and 404).

3) If the front image 42 is desired to be projected, the key 220 is depressed (step 405), whereby the carrier movement control circuit 212 moves the carrier C at a high speed toward the destination position in the rear direction (step 406), and there is awaited the arrival at the front image position 300 (step 407). Upon arrival of the carrier C at the front image position, the movement of the carrier C is stopped (step 408) and the sequence is terminated.

4) If the rear image is desired to be projected, the key 221 is depressed (step 414), whereby the carrier movement control circuit 212 moves the carrier C at a high speed toward the destination position in the front direction (step 415). Upon arrival of the carrier C at the rear image position, the movement of the carrier C is stopped (step 417) and the sequence is terminated.

5) If the projecting magnification is less than the image reduction rate at recording, there is judged the simultaneous projection of the front and rear images 41, 42 (step 409), and the key 220 or 221 is depressed.

In response to it, the carrier control circuit 212 moves the carrier C at a high speed toward the center (step 411), and when the position 302 for simultaneous display of the front and rear images is reached (step 412), the movement of the carrier is stopped (step 413).

Figure 18:
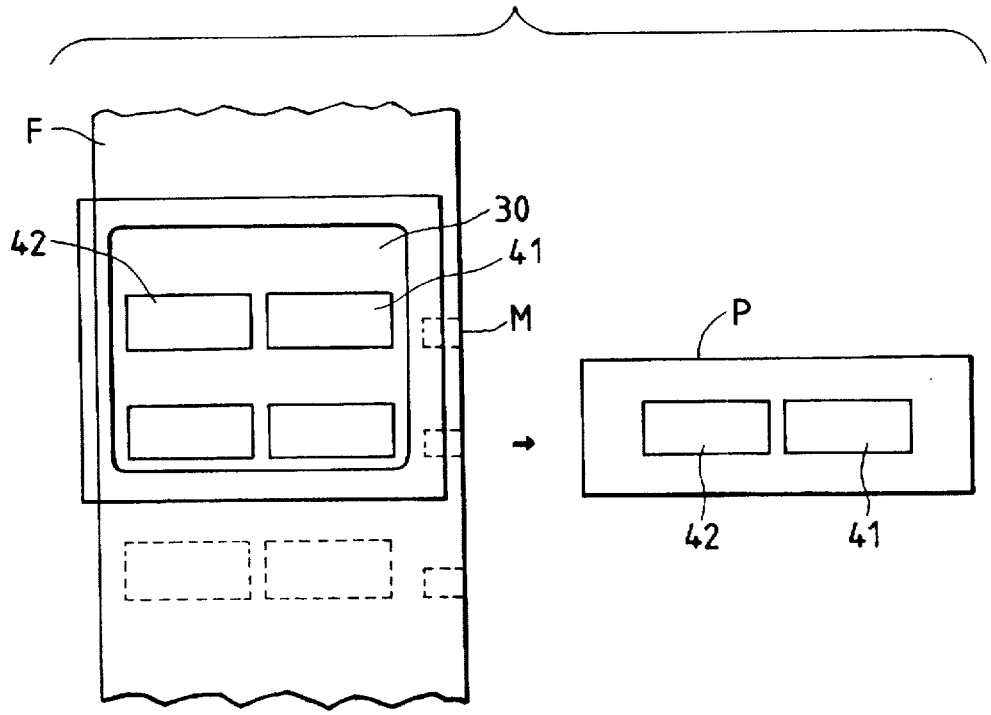
FIG. 18 is a schematic view of a 90° rotated image of a duplex film projected on a screen.

By such movement of the carrier C to the front/rear image simultaneous display position, there can be projected erect front and rear images 41, 42 on the screen 30 as shown in FIG. 16C. It is also possible to rotate the display by 90°, thereby obtaining the front and rear images 41, 42 in laterally aligned positions as shown in FIG. 18, and to print such front and rear images on a long sheet.

[Control example 2]

In the control example 1, the operator manipulates the key 220 or 221 after determining the position of movement of the carrier C by judging the projecting magnification, but it is also possible to effect the movement to the desired position in response to a key manipulation after the CPU automatically judges the projecting magnification based on information from magnification detecting means. More specifically, the movement is made always to the front-rear simultaneous projecting position in case of a high projecting magnification, and is to the front image position 300 or the rear image position 301 in case of a low projecting magnification because only one image can be projected in such case.

Figure 19A:
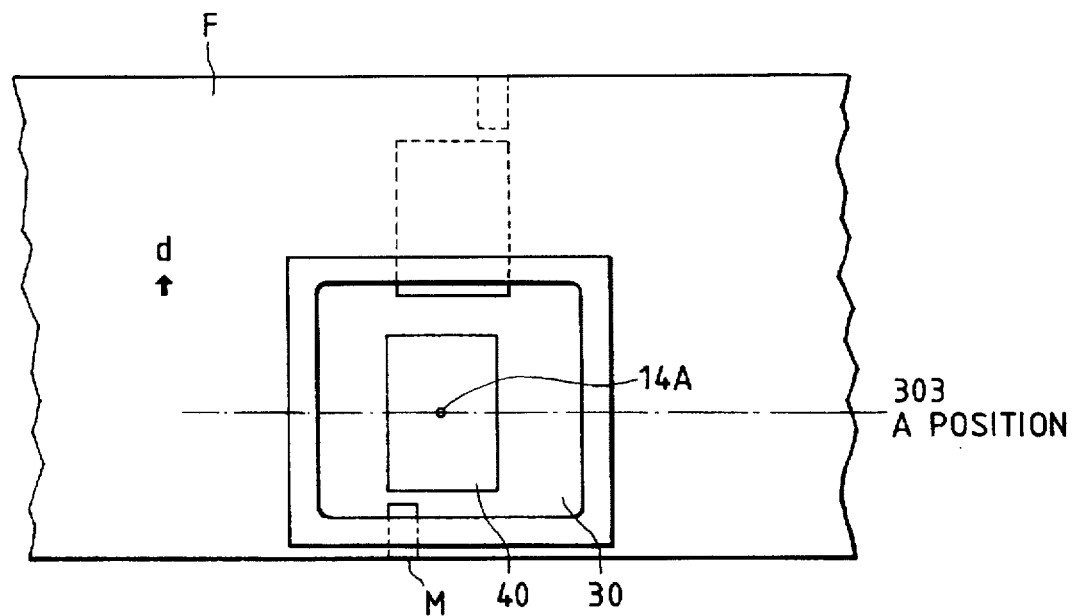
FIGS. 19A and 19B are schematic views showing the position control of the images of a duo film projected on a screen.
Figure 19B:
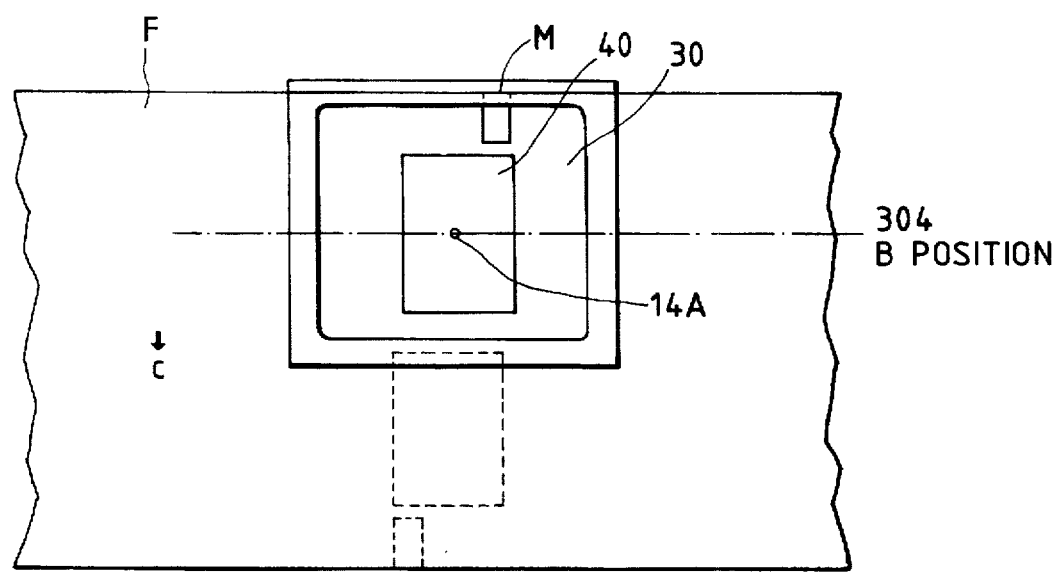
Figure 20:
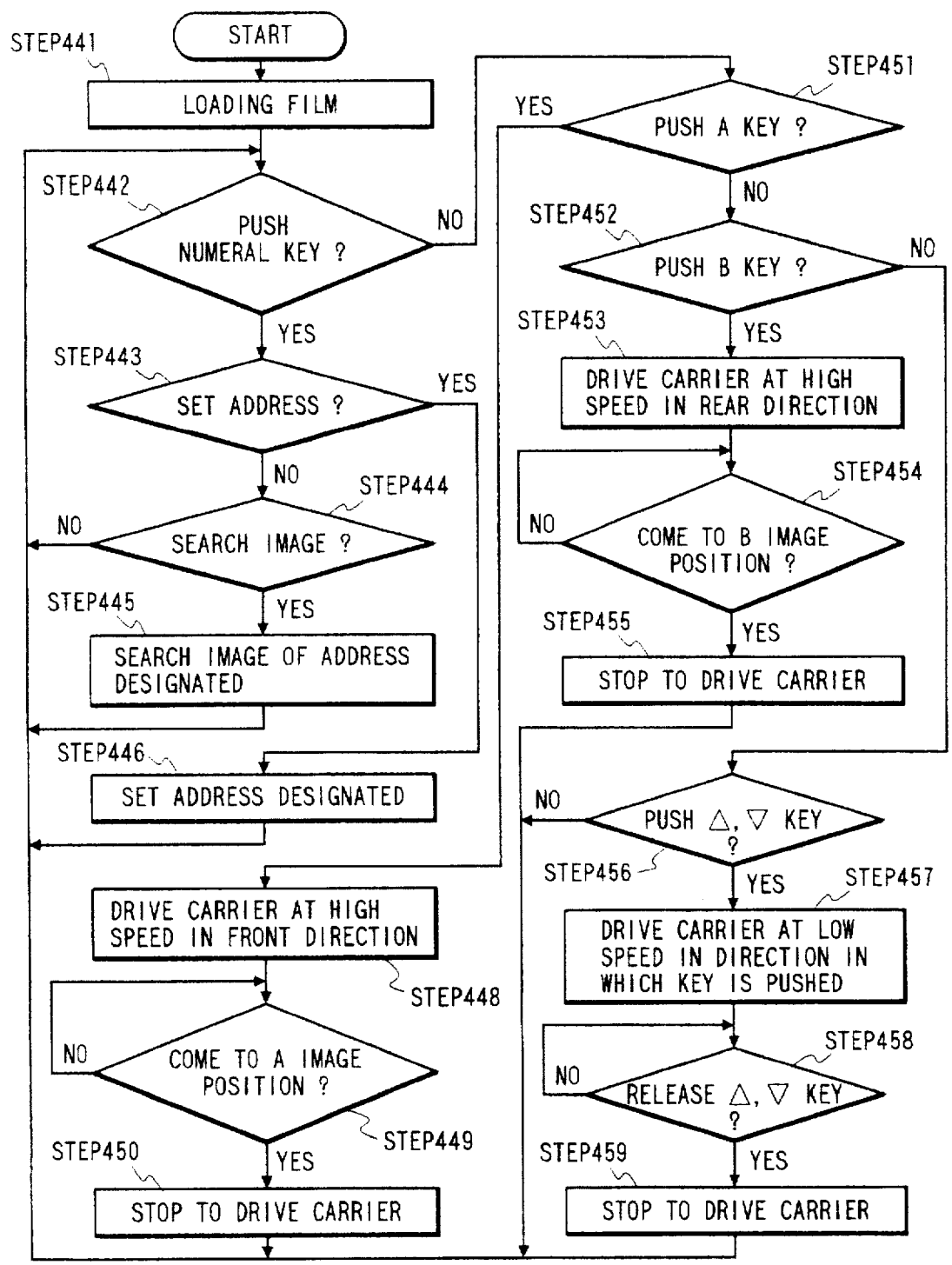
FIG. 20 is a flow chart showing the control sequence of such position control.

[Control example 3] (FIGS. 19A, 19B and 20)

The control example 1 shows the case of duplex film having the front and rear images in the width direction of the film, but the position in the width direction can be similarly moved by a key operation in case of a duo film in which recording in the forward and backward directions has been made, as shown in FIG. 13A.

FIGS. 19A and 19B show an example of movement of the image on the screen 30 by the control unit 203 for the duo film as shown in FIG. 13A.

The input means 23 of the control unit 203 is provided with the A key 227 (FIG. 12) for designating a forward image address and the B key 226 for designating a backward image address. The depression of the A key 227 causes a movement of the carrier C to the image position 303 in the A channel in a direction d as shown in FIG. 19A, while the depression of the B key 226 causes a movement to the image position 304 in the B channel in a direction c as shown in FIG. 19B.

If desired to move to the center of the film, the apparatus may be so constructed that the A key 227 or the B key 226 is again depressed to thereby move to the center of the images of the A and B channels instantaneously.

FIG. 20 is a flow chart showing such operations of image search, movement in the width direction and fine position adjustment in the width direction by the carrier position fine adjustment keys 222, 223.

1) After loading the microfilm F in a step 441, a step 442 discriminates the depression of a numeral key 225, and, if the numeral key (step 443), there is discriminated whether an image search is instructed (step 444). If the search key 224 has been depressed, there is searched the designated address (step 446).

2) If the A key 227 has been depressed, not the numeral key (step 451), the carrier movement control circuit 212 moves the carrier C at a high speed toward the destination position in front direction (step 448), and there is awaited the arrival at the image position 303 of the A channel (step 449). Upon arrival of the carrier C at the image position 303 of the channel A, the carrier C is stopped and the sequence is terminated (step 450).

3) If the B key 226 has been depressed (step 452), the carrier movement control circuit 212 moves the carrier C at a high speed toward the destination position in rear direction (step 453), and there is awaited the arrival at the image position 304 of the B channel (step 454). Upon arrival of the carrier C at the image position 304 of the channel B, the carrier C is stopped and the sequence is terminated (step 455).

4) If the key 222 or 223 has been depressed (step 456), the carrier C is moved at a low speed for fine adjustment in a direction in which the depressed key is depressed (step 457). When the key 222 or 223 is released (step 458), the carrier C is stopped and the sequence is terminated (step 459).

Figure 21:
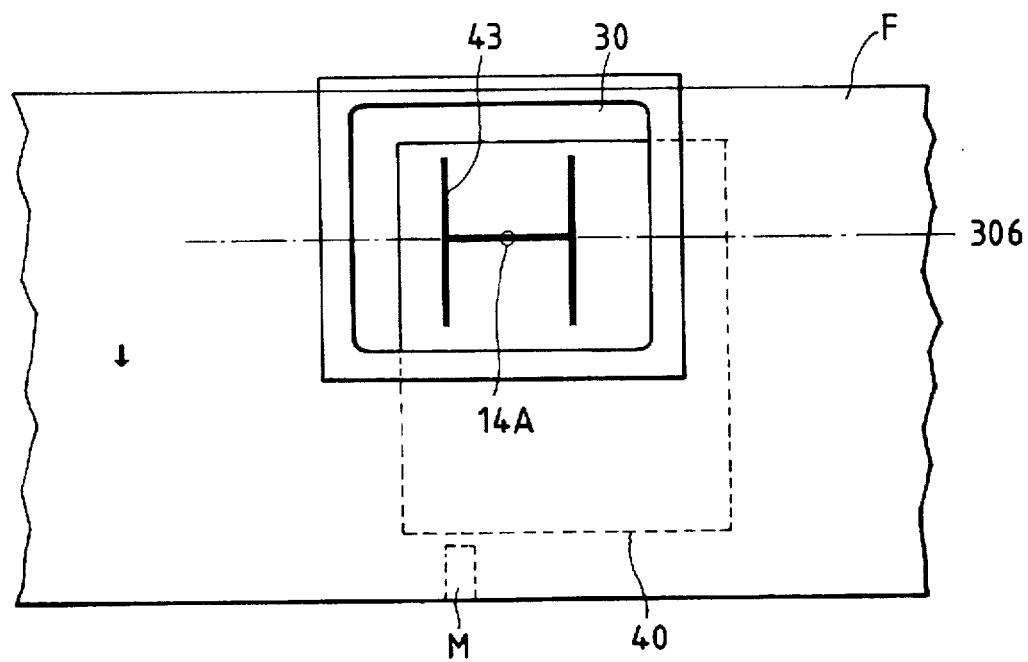
FIG. 21 is a schematic view of an image of a simplex film partially projected on a screen.

[Control example 4] (FIG. 21)

The control example 1 is directed to the duplex film, but when it is desired, for example, with the simplex film as shown in FIG. 13C to always project an upper partial portion 43 of the image in magnified manner, it is possible to provide the ↑ key 220 with a function for moving to a specified position 306, thereby projecting the specified image in the specified position on the screen 30 as shown in FIG. 21 with depressing such key 220.

[Control example 5]

For the different films shown in FIGS. 13A to 13C, the image positions 300 to 304 can be respectively set since these positions vary in the width direction of the films, depending on the states of the recorded images. In the foregoing there has been explained a case of setting two or three image positions, but it is also possible to set and memorize a larger number of positions, and to provide additional keys for position movement or to select the positions with numerals, accordingly.

Figure 22A:
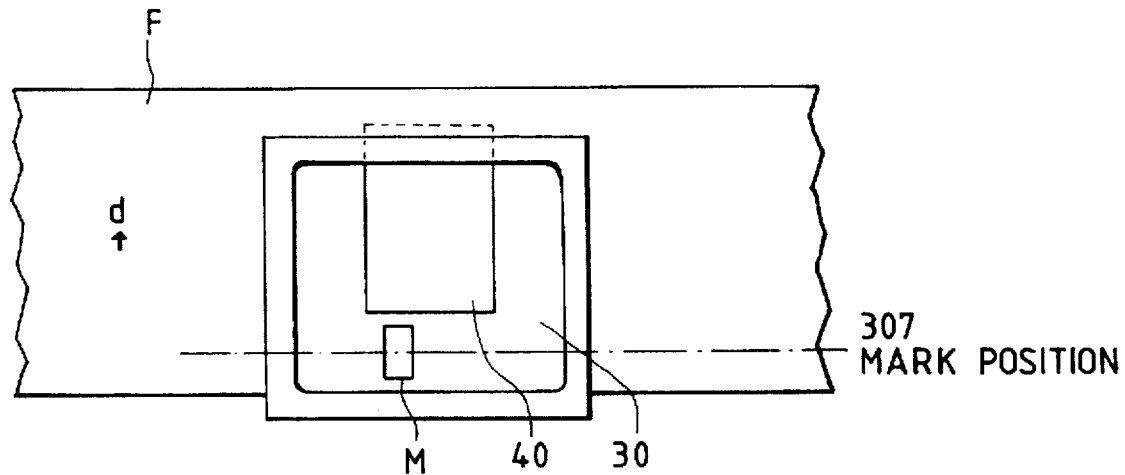
FIGS. 22A and 22B are schematic views showing the principle of projecting a search mark portion on a screen and measuring the external dimension of the mark, respectively.
Figure 22B:
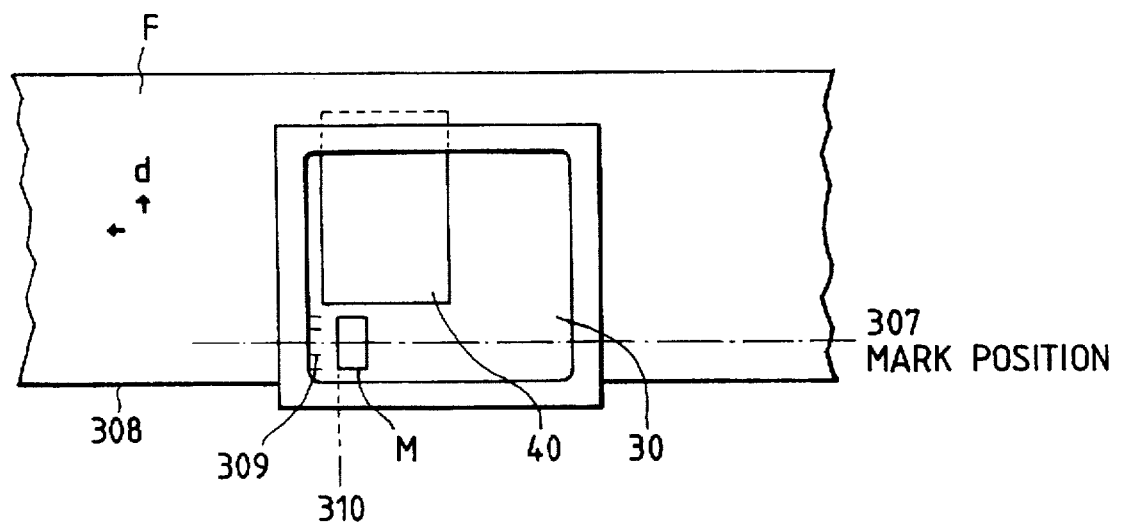
Figure 23:
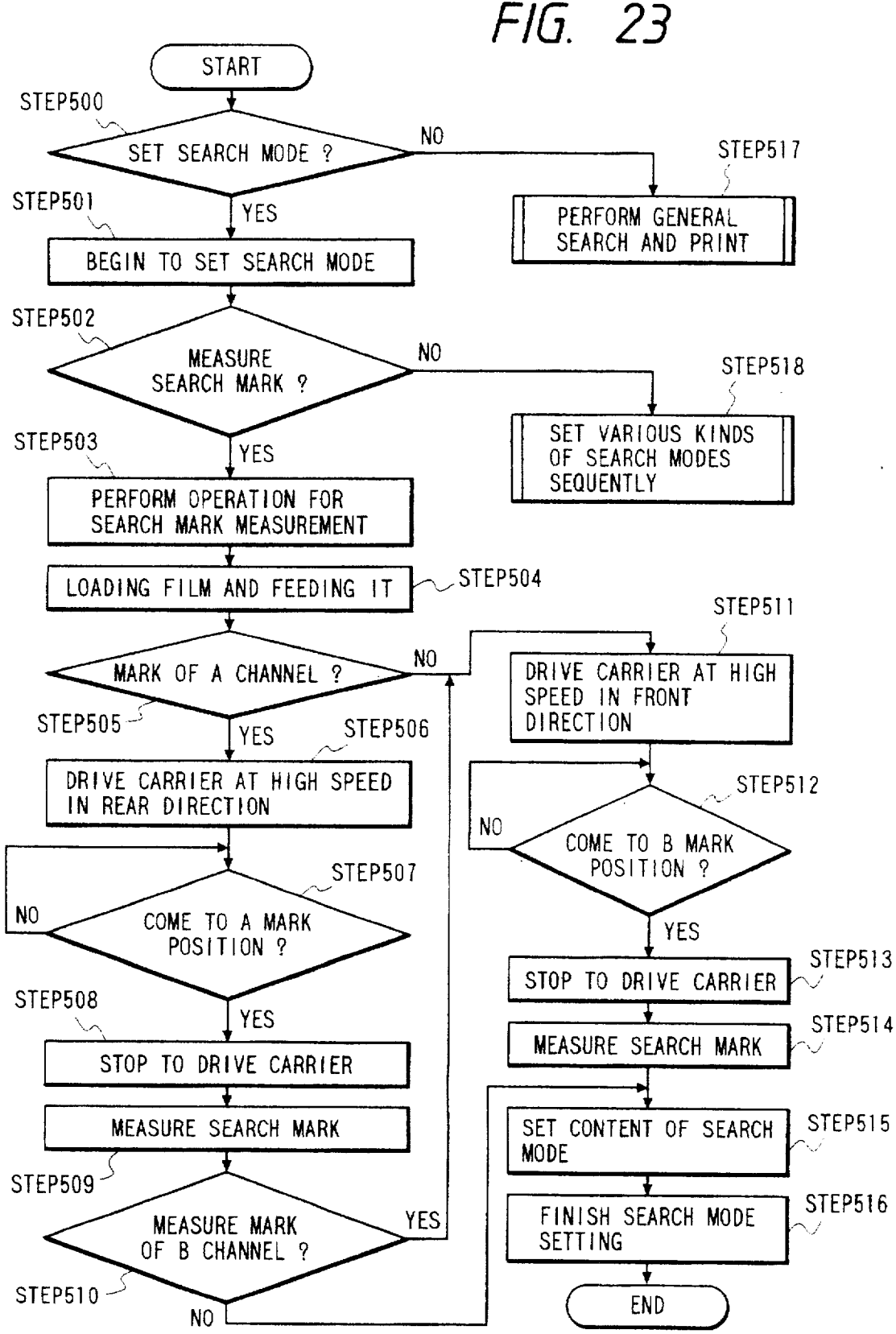
FIG. 23 is a flow chart for realizing such principle.

|Fourth Embodiment| (FIGS. 22A, 22B and 23)

The screen 30 of the microfilm reader-printer is usually used for projecting an image 40 only, but it may be required to project an area other than the image, depending on the setting or the operation mode of the microfilm searching apparatus.

The microfilm searching apparatus is so constructed as to detect the search mark M with the detection sensor 17 and to search the desired image by counting and calculating the address with the position or length of such mark M, but it may be necessary to adjust the searching device and to move the position of the detection sensor 17, depending on the length on the height of the search mark n, to thereby adjust the image stop position or to improve the accuracy of search.

The search mark M is usually given in three sizes, large, medium and small, and it is necessary to confirm the kind of the mark in order to judge whether the size of the mark matches the standard or to identify the program appropriate for searching. Also, it may be necessary to adjust the position of the sensor 17 for adequately effecting the search, depending on the height (length in the width direction) of the search mark.

The present embodiment provides measuring the external dimension of the mark M in a simple manner by actually measuring the size of the mark M on the screen and calculating the actual size in consideration of the projecting magnification.

Prior to the start of search, a search mark measuring mode is set in order to effect various settings by measuring the size of the search mark M. By the actuation of a predetermined key in this mode, the carrier C is moved in the rear direction d from a state where the image 40 is projected on the center of the screen 30, then the carrier C is moved to a position where the mark M can be confirmed, and is stopped there, thus the search mark M can be confirmed on the screen 30, as shown in FIG. 22A. If a scale 309 is printed on the screen 30 for measuring the size of the mark M as shown in FIG. 22B, the size of the mark M can be easily measured.

Also, the duo film has search marks on both A and B channels as shown in FIG. 13A, the carrier C is moved, at setting of the search mode, not only in the rear direction d but also in the front direction c for displaying the search mark M of the B channel side.

In the following there will be explained, with reference to a flow chart in FIG. 23, an example of measuring the search marks of the duo film.

1) At first, if in a step 500 the search mode is set a step 501 sets the search mode in response to an input from the operation unit, and a step 502 discriminates whether the measurement of the search mark M is required.

2) If the setting of the search mode is not made, there is set a sequence for image search or print (step 517), and if the measurement of the search mark M is not executed, there is sequently conducted the setting of the search modes (step 518).

3) If the measurement of the search mark M is selected, in response to an operation therefor (step 503), the film is loaded and transported to move an image on the projecting optical path (step 504), and there is discriminated whether the measurement is made on the mark of the channel A (step 505).

4) In case of mark measurement of the channel A, the carrier C is moved in the rear direction d at a high speed (step 506), and, when the mark of the channel A reaches the mark measuring position (step 507), the carrier is stopped (step 508), and the size of the search mark M is measured on the screen 30 (step 5) In case of mark measurement of the channel B, the carrier C is moved in the front direction c at a high speed (step 511), and, when the mark of the channel B reaches the mark measuring position (step 512), the carrier C is stopped (step 513), and the size of the search mark M is measured on the screen 30 (step 514).

6) After the measurement is ended, the content of the search mode is set according to the result of the measurement (step 515), and the setting of the search mode is terminated (step 516).

In the present embodiment, the size of the search mark M can be measured on the screen 30, but the carrier C may also be so moved that a film edge 308 coincides with the end of the screen 30 as shown in FIG. 22B, when it is desired to know the height of the mark M or the position thereof from the microfilm edge. In such case the height of the search mark can be immediately determined by providing the screen 30 with the scale 309. In case of using such scale 309, the search mark M has to be brought immediately adjacent to the side of the scale, so that, in case of the search mark measuring mode, the film may be moved not only in the width direction but also in the longitudinal direction to bring the search mark M to a mark stop position 310.

In the present embodiment, the actual size of the search mark M is calculated from the size measured on the screen 30, in consideration of the projecting magnification, but it is also possible to employ means for controlling the projecting magnification to a predetermined value using a zoom lens or the like, and to automatically adopt such predetermined magnification upon the search mark measuring mode, then to move the carrier.

In such case, the actual size of the mark can be simply measured on the screen 30 by printing the size in such predetermined magnification, without giving consideration to the projecting magnification.

According to the present invention, as explained in the foregoing, in the information searching apparatus provided with means for transporting a long information recording medium in the longitudinal direction thereof relative to search means, searching desired information by detecting search marks attached corresponding to the information recorded on the information recording medium by detection means and adapted to move the apparatus in the width direction of the information recording medium, the work efficiency can be improved by achieving the movement of the apparatus in such width direction at a higher speed.

In case of a microfilm carrier, the film carrier is provided with a drive device in the width direction of the microfilm, and such drive device is so controlled by a predetermined operation of an input device, to thereby promptly move the projecting position (carrier position) or the image position on the screen such that the desired image information on the information recording medium is projected on the predetermined position. Thus, in contrast to the conventional apparatus in which the operator has to continue to depress the carrier position fine adjustment key until the carrier is moved to the desired position with a slow fine adjusting speed, there can be achieved a prompt movement from the image position at a side of the microfilm to that at the other side, by a single operation of the input device in the beginning. Such movement can be controlled with an optimum speed since the distance to the target position is known in advance, so that the predetermined position can be reached in the shortest time.

Also, in case the carrier stop position is deviated from a predetermined position, the carrier can be promptly returned to such predetermined position by a similar operation, without using the carrier position fine adjustment key.

Also, there is provided projecting magnification detection means, and the target projecting position is determined from the projection area on the screen, determined from the magnification detected by such detection means.

Thus, in the information searching apparatus provided with a carrier including means for transporting a microfilm constituting the information recording medium bearing recorded images thereon, and carrier width direction movement means for moving the carrier in the width direction of the microfilm, the present invention enables a high-speed movement of the carrier to a desired width direction position by the width direction movement means with a specified key operation, thereby obtaining an advantage of achieving image movement on the screen in a more prompt manner and more accurately, in comparison with manual position adjustment with the fine adjustment key.

It is also possible to reduce the time required for image positioning by memorizing positions corresponding to different projecting magnifications to select a stop position in the width direction according to the recorded status of the image and the projecting magnification and to move the image to such stop position by a key operation for position movement.

Furthermore, upon setting of the search mode, a mode for measuring the size of the search mark is entered, the search mark is projected on the screen, thereby obtaining an advantage of enabling easy confirmation of the size, kind of the search mark or the like.

Figure 24:
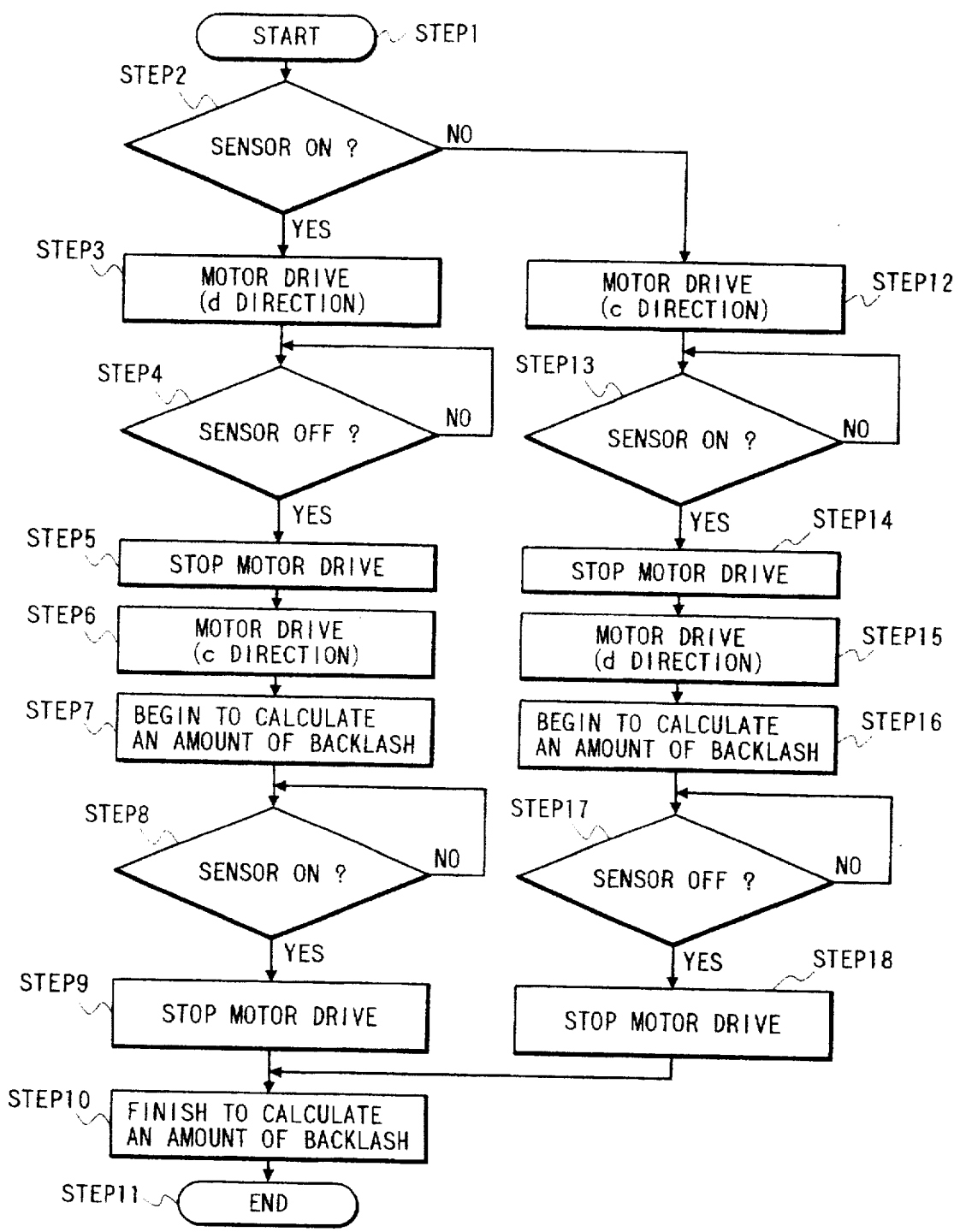
FIG. 24 is a flow chart for calculating backlash amount.

[Fifth Embodiment] (FIG. 24)

In this embodiment, the movement of the film carrier C in the width direction c or d is controlled with the correction by the calculation of a backlash amount caused by the function of the carrier movement mechanism B, as will be explained in the following.

FIG. 24 is a flow chart showing a method of calculating the backlash amount of the carrier driving device for moving the film carrier C in the width direction of the microfilm F.

When the reference position detection means 38 is composed of a transmission sensor 50 and a light shield plate 51 as shown in FIG. 5, there can be employed a method of backlash calculation as shown in FIG. 24.

1) In case the transmission sensor 50 is turned on by the light interruption with the light shield plate 51 (ON), the motor 37 is rotated to move the microfilm carrier C in the direction d, to an OFF position where the transmission sensor 50 is no longer interrupted by the light shield plate 51, and the motor 37 is stopped at such position (steps S2 to S5).

Then, the motor 37 is rotated in the reverse direction to move the microfilm carrier C in the direction c (opposite to the direction d) (step S6). In this operation, since the microfilm carrier C has a certain backlash, it does not move for a predetermined time after the start of the motor 37. After that, the film carrier C starts to move, whereby the transmission sensor 50 shifts from the OFF state to the ON state. The backlash amount can be determined by the time from the time of the start of reverse rotation of the motor 37 to the time when the transmission sensor 50 becomes the ON state. Stated differently, the backlash amount can be defined by the time from the start of reverse rotation of the motor 37 to the start of actual movement of the film carrier C (steps S7 to S11).

2) In case the transmission sensor 50 is not interrupted by the light shield plate 51 (OFF), the motor 37 is rotated to move the microfilm carrier C in the direction c to an ON position where the transmission sensor 50 is interrupted by the light shield plate 51, and the motor 37 is stopped at such position (steps S2, S12 to S14).

Then, the motor 37 is rotated in the reverse direction to move the microfilm carrier C in the direction d (opposite to the direction c). In this operation, since the microfilm carrier C has a certain backlash, it does not move for a predetermined time after the start of the motor 37. After that the film carrier C starts to move, whereby the transmission sensor 50 shifts from the ON state to the OFF state. The backlash amount can be determined by the time from the start of reverse rotation of the motor 37 to the time when the transmission sensor 50 becomes the OFF state. Stated differently, the backlash amount can be defined by the time from the start of reverse rotation of the motor 37 to the start of actual movement of the film carrier C (steps S15 to S18, S10 and S11).

The backlash amount calculated in 1) or 2) as abovementioned is processed in the following manner by the process means 20.

To move the carrier C in the width direction of the microfilm F means to drive the motor 37. Therefore, the process means 20 memorizes the driving direction of the motor 37, and, when the motor 37 is driven in a direction opposite to that in the preceding operation, the motor 37 is driven with addition of the sum of the drive amount and the backlash amount.

As an example, in case of a drive in the direction d with a drive amount of 500 ms and a backlash amount of 150 ms, the process means 20 executes a drive for 500 ms+150 ms=650 ms in the direction d if the preceding drive was in the direction c, but a drive for 500 ms in a direction Al if the preceding drive was in the direction d.

The process means 20 is so constructed as to compare the driving direction of the motor 37 with the preceding driving direction and, if they are mutually different, to effect the drive by adding the backlash amount to the drive amount.

In this operation, only the drive corresponding to the backlash amount is executed at a high speed, thereby reducing the time of standstill of the microimage projected on the screen, resulting from the presence of such backlash.

In the present embodiment, the backlash amount is calculated from the drive time of the motor 37, but it may also be determined from the number of drive pulses therefor. Since the backlash amount in the film carrier C is different on each film carrier C, the backlash amount may be calculated when the film carrier C is powered or when instructed from the input means 23. Stated different, the backlash amount need not be calculated for each movement of the projecting position of the microimage in the width direction of the microfilm F, but the backlash amount can be calculated and memorized in advance.

In the following there will be explained a method in which in case of automatically moving the position of the projected microimage by driving the film carrier C in the width direction of the microfilm F, when the drive amount is inputted from the input means 23, the film carrier C is driven with correcting the backlash amount by the drive amount inputted. It is thus rendered possible for the operator to input the movement amount from the input means 23 while observing the microimage projected on the screen 30 and without considering the backlash amount with driving the film carrier C by the inputted movement amount.

Since the duo type microfilm has the microimages recorded in two channels as shown in FIG. 13A, in order to effect automatic movement to the respective image positions, the image position based on the position of the transmission sensor 50 as a reference position can be inputted from the input means 23. Also, since the microfilms of other types have the image positions different from those of the duo type microfilm, the image position based on the transmission sensor 50 as a reference position can be inputted from the input means 23. Thus, the film carrier C can memorize the information of three image positions, taking the transmission sensor 50 as the reference position.

In such construction, when a movement distance is inputted from the input means 23 based on the transmission sensor 50 as the reference position, the motor 37 is driven to the currently set position of movement, or to a changed position when the movement distance is changed. If the moving distance is changed so that the drive direction of the motor 37 is different from the preceding one, the motor 37 is driven with adding thus changed distance to the aforementioned backlash amount. In this manner it is rendered possible to confirm whether the moving distance is accurately set, and to avoid an error in the moving distance resulting from the backlash, thereby enabling precise setting of the moving distance.

As explained in the foregoing, in an image searching apparatus provided with a film carrier for supporting a microfilm F bearing microimages thereon, and a film width direction movement means for moving the film carrier in the width direction of the microfilm, the present embodiment effects the movement of the film carrier in the width direction of the film when the position of movement in the width direction is identified, thereby achieving the positioning in width direction of the microfilm for projecting the microimage on the screen in a similar manner.

Also, there is defined a reference position for the movement of the film carrier, and there are provided means for inputting a movement amount from the reference position in the width direction of the microfilm in the film carrier and a memory device for storing such movement amount, wherein the film carrier is so moved as to project any microimage in the predetermined position by a simple searching operation, even for a microfilm with a different recording standard, once the movement amount from the reference position is set by the input means. Thus, the present invention can be realized with a simple construction including the width direction microfilm moving means and a reference sensor, and can achieve the microimage projecting operation in an efficient manner.

It is also rendered possible to accommodate fluctuation in the backlash amount for each apparatus to achieve width direction movement of the film carrier disregarding the backlash, by automatically calculating the backlash amount caused by the movement of the film carrier in the width direction of the microfilm and controlling the width direction carrier movement means with the correction by such backlash amount in such width direction movement of the film carrier. In this manner the image position projected on the screen can be exactly set, and the image movement can be achieved exactly reproducing the inputted amount of movement, so that the searching operation for projecting the desired image on the screen, can be realized in an automated and secure manner.

As explained in the foregoing embodiment, in order to project the microimage of a simplex type microfilm as shown in FIG. 11A on the screen 30, if the last film is a duo type microfilm F, the film carrier C is moved by the shift mechanism B to a position corresponding to such simplex type microfilm F.

However, when a prism lens 240 is provided in the projecting optical path for image rotation as shown in FIG. 9, the projected image position moves as indicated by Y1 in FIG. 10A if the prism lens 240 is rotated in order to correct the inclined projected microimage IM.

In the second embodiment there is, therefore, provided correction means for varying the shift amount of the film carrier C in the width direction of the film according to the image rotation or the projecting magnification, thereby correcting the relative position between the film and the screen.

In the present embodiment, in the movement of the film carrier C in the width direction of the microfilm F, the process means 20 corrects the moving amount by processing the rotation angle detected by the prism lens rotation angle detection means 246 and the rotation angle detected by the zoom lens rotation angle detection means 247 and also calculating the backlash amount as in the foregoing embodiment.

When the zoom lens 241 is rotated for enlarging an image to a desired magnification, the magnification of projection varies as shown in FIG. 10B, and the magnified image IM' moves to a position indicated by arrows L2, and may protrude from the screen 30. In such case the process means 20 calculates the moving amount L2, utilizing detection means for detecting whether the image is projected within the screen without protruding from there, based on the detected magnification and an unrepresented image position sensor, and corrects the moving amount of the film carrier C. Also, the moving amount of the film carrier C is corrected by the calculation of the backlash amount.

Also, when the prism lens 240 is rotated for correcting an inclined image, the projected image rotates as shown in FIG. 10A, and may protrude from the screen 30. In such case the process means 20 calculates the moving amount L1, utilizing detection means for detecting whether the image is projected within the screen without protruding from there, based on the detected angle θ and an unrepresented image position sensor. The moving amount L1 is calculated from the projection magnification and is used for correcting the moving amount of the film carrier. Also, the moving amount of the film carrier C is corrected by the calculation of the backlash amount.

In the present embodiment, the prism lens 240 and the zoom lens 241 are driven with motors, but they may also be driven manually if the rotation angle of the image and the magnification of projection can be detected.

Also, the rotation of the prism lens 240 may cause deviation in the projected image position because of deviation in the optical axis due to rotation. It is, therefore, possible also to detect the amount of deviation of the optical axis, calculated by unrepresented optical axis deviation detection means based on the rotation angle of the prism lens 240, and to add such amount of displacement to the correction value.

In the duo type microfilm, the recording direction of the image has been varied depending on the channel, so that the image projected on the screen 30 may become inverted. It is, therefore, possible to automatically rotate the prism lens 240 to obtain an erect projected image and to add the amount of deviation caused by such image rotation, to the correction value.

Thus, the film carrier can be more exactly moved to the predetermined position, by adding correction value depending on the rotation angle of the projected image and the magnification of projection, to the moving amount, so that the desired image can be securely projected on the screen 30.

As explained in the foregoing, according to the present invention, in the information searching apparatus provided with means for transporting a long information recording medium and searching and placing a desired image frame portion at a predetermined position, such as the rolled microfilm carrier provided in the microfilm reader or the reader-printer, and means for moving such searching means in the width direction of the microfilm, the present invention allows (1) to achieve the positioning of a desired image information portion relative to a predetermined position in the width direction of the information recording medium, by moving the apparatus in the width direction, in simpler operations, (2) to project a desired image information portion in an efficient manner regardless of the recording standard of the image information on the information recording medium, (3) to securely project a desired image information portion on a screen, and (4) to eliminate the deterioration in the controlling precision resulting from the backlash caused by the function of the width direction movement means.

What is claimed is:

1. A search apparatus for searching a desired image on a recording medium onto which plural images have been recorded in at least one line, comprising:
    a carrier including transport means for supporting and transporting said recording medium;
    support means for supporting said carrier so as to be movable in a direction perpendicular to a direction of said transportation;
    drive means for moving said carrier in said perpendicular direction;
    detection means for detecting a reference position of said carrier;
    measurement means for measuring a moving amount of said carrier; and
    control means for controlling said drive means based on the measurement value of said measurement means after the reference position of said carrier has been detected by said detection means.

2. A search apparatus according to claim 1, wherein said measurement means is adapted to start the measurement of the moving amount based on the detection of the reference position by said detection means.

3. A search apparatus according to claim 1, further comprising input means for inputting the moving amount of said carrier.

4. A search apparatus according to claim 1, further comprising means for setting the moving amount of said carrier according to a type of the recording medium.

5. A search apparatus according to claim 3, wherein said drive means is controlled through comparison of the value inputted by said input means with the measured value by said measurement means.

6. A search apparatus according to claim 1, further comprising:
    projection means for projecting an image of the recording medium onto a projection plane;
    magnification detection means for detecting the projecting magnification of the image; and
    means for adjusting the moving amount of the carrier according to the magnification detected by said magnification detection means.

7. A search apparatus according to claim 1, further comprising:
    measurement means for measuring a backlash amount when the carrier is moved, and
    means for adjusting the moving amount of the carrier based on the measured backlash amount.

8. A search apparatus according to claim 1, wherein said drive means is so controlled that the carrier is moved to a predetermined position prior to completion of search of a desired image.

9. A search apparatus according to claim 1, wherein the recording medium is a microfilm bearing images and search marks.

10. A projection apparatus for projecting a selected image on a film onto which plural images have been recorded in one line or plural lines in a width direction of a long film, comprising:
    a film carrier including transport means for supporting and transporting said film in a longitudinal direction;
    a support member for supporting said carrier so as to be movable in a width direction of said film;
    drive means for moving said film carrier in said width direction;
    detection means for detecting a reference position of said film carrier in said width direction;
    measurement means for measuring the moving amount of said film carrier; and
    control means for controlling said drive means based on the measurement value of said measurement means after the reference position of said film carrier has been detected by said detection means.

11. A projection apparatus according to claim 10, wherein said measurement means is adapted to start the measurement of the moving amount based on the detection of the reference position by said detection means.

12. A projection apparatus according to claim 10, wherein, when the film carrier is moved, said drive means is controlled so as to move the film carrier in a direction in which the reference position is detected by said detection means, and, after the reference position has been detected, so as to stop the film carrier when a predetermined moving amount is measured by said measurement means.

13. A projection apparatus according to claim 12, wherein said measurement means is adapted to start the measurement of the moving amount after the reference position has been detected by said detection means.

14. A projection apparatus according to claim 10, further comprising input means for inputting the moving amount of the film carrier.

15. A projection apparatus according to claim 10, further comprising means for setting the moving amount of the film carrier according to a type of the film.

16. A projection apparatus according to claim 14, wherein said drive means is controlled through comparison of the value inputted by said input means with the measured value by said measurement means.

17. A projection apparatus according to claim 10, further comprising means for adjusting the moving amount of the film carrier according to magnification of the image projected on said projection plane.

18. A projection apparatus according to claim 10, further comprising means for adjusting the moving amount of the film carrier according to a backlash amount in the movement of the film carrier.

19. A projection apparatus according to claim 18, further comprising means for calculating the backlash amount in the movement of the film carrier.

20. A projection apparatus according to claim 10, wherein the film carrier is moved to a predetermined position prior to transporting of the film by said transport means.

* * * * *

UNITED STATES PATENT AND TRADEMARK OFFICE
CERTIFICATE OF CORRECTION

PATENT NO. : 5,758,939
DATED : June 2, 1998
INVENTOR(S) : Ochiai et al.

It is certified that error appears in the above-identified patent and that said Letters Patent is hereby corrected as shown below:

SHEET 21:

FIG. 23, "SEQUENTLY" should read --SEQUENTIALLY--.

COLUMN 14:

Line 43, "8 Control" should read --[Control--.

COLUMN 18:

Line 3, "(step" should read --(step 509).--

Signed and Sealed this

Sixteenth Day of March, 1999

Attest:

Q. TODD DICKINSON

*Attesting Officer*          *Acting Commissioner of Patents and Trademarks*